(12) United States Patent
Nobayashi

(10) Patent No.: US 9,635,243 B2
(45) Date of Patent: Apr. 25, 2017

(54) RANGING APPARATUS, IMAGING APPARATUS, AND RANGING METHOD

(71) Applicant: CANON KABUSHIKI KAISHA, Tokyo (JP)

(72) Inventor: Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/008,898

(22) Filed: Jan. 28, 2016

(65) Prior Publication Data

US 2016/0150151 A1 May 26, 2016

Related U.S. Application Data

(63) Continuation of application No. 14/501,612, filed on Sep. 30, 2014, now Pat. No. 9,294,668.

(30) Foreign Application Priority Data

Oct. 7, 2013 (JP) ................................. 2013-210114

(51) Int. Cl.
*G03B 13/00* (2006.01)
*H04N 5/232* (2006.01)
*H04N 5/225* (2006.01)
*H04N 5/369* (2011.01)
*H04N 5/235* (2006.01)
*H04N 5/243* (2006.01)

(52) U.S. Cl.
CPC ....... *H04N 5/23212* (2013.01); *H04N 5/2254* (2013.01); *H04N 5/2351* (2013.01); *H04N 5/243* (2013.01); *H04N 5/3696* (2013.01)

(58) Field of Classification Search
CPC ............ H04N 5/2356; H04N 5/23212; H04N 5/23264; G02B 7/28; G02B 7/30; G02B 7/34; G02B 7/343; G02B 7/346; G03B 13/32; G03B 3/00; G01S 17/48; G06T 5/003; G06T 5/004
USPC .................................................. 348/345–356
See application file for complete search history.

(56) References Cited

U.S. PATENT DOCUMENTS

| 5,892,578 A * | 4/1999 | Suda ...................... G02B 7/346 356/123 |
| 9,083,877 B2 | 7/2015 | Ogawa |
| 2010/0013947 A1* | 1/2010 | Oikawa .............. H04N 5/23212 348/222.1 |

(Continued)

FOREIGN PATENT DOCUMENTS

| JP | 2-181108 A | 7/1990 |
| JP | 2003-244712 A | 8/2003 |

(Continued)

*Primary Examiner* — Chia-Wei A Chen
(74) *Attorney, Agent, or Firm* — Fitzpatrick, Cella, Harper & Scinto

(57) ABSTRACT

A ranging apparatus includes: an output ratio data calculation unit for calculating an output ratio data of first and second image data; a correction function calculation unit for calculating a correction function approximating the output ratio data by an N-order function (N being an integer equal to or greater than 1) having a pixel position as a variable; a correction unit for correcting at least one of the first and second image data on the basis of the correction function; and a ranging unit for calculating the defocus amount by using the picture image data corrected by the correction unit.

17 Claims, 15 Drawing Sheets

(56) References Cited

U.S. PATENT DOCUMENTS

| | | | | |
|---|---|---|---|---|
| 2011/0085786 A1* | 4/2011 | Tamaki | ............... | G03B 13/36 |
| | | | | 396/104 |
| 2011/0096171 A1* | 4/2011 | Kimura | ............... | G02B 7/34 |
| | | | | 348/187 |
| 2011/0109775 A1* | 5/2011 | Amano | ............ | H04N 5/23212 |
| | | | | 348/241 |
| 2011/0170803 A1* | 7/2011 | Yokoi | ............... | G06T 3/4007 |
| | | | | 382/300 |
| 2012/0062786 A1* | 3/2012 | Hamano | ............. | G02B 7/38 |
| | | | | 348/345 |
| 2012/0300104 A1* | 11/2012 | Onuki | ............ | H04N 5/23212 |
| | | | | 348/302 |
| 2013/0342751 A1* | 12/2013 | Yoshimura | ....... | H04N 5/23212 |
| | | | | 348/349 |
| 2014/0063234 A1 | 3/2014 | Nobayashi | | |
| 2014/0192162 A1* | 7/2014 | Aoki | ..................... | G02B 7/34 |
| | | | | 348/46 |
| 2015/0062389 A1* | 3/2015 | Takeuchi | ........ | H04N 5/23212 |
| | | | | 348/273 |
| 2015/0244926 A1* | 8/2015 | Inoue | .................... | G02B 7/34 |
| | | | | 348/350 |
| 2015/0281560 A1* | 10/2015 | Inoue | ............... | H04N 5/23293 |
| | | | | 348/222.1 |

FOREIGN PATENT DOCUMENTS

| | | |
|---|---|---|
| JP | 2009-124574 A | 6/2009 |
| JP | 2009-258231 A | 11/2009 |
| JP | 2010-26178 A | 2/2010 |
| JP | 2010-145544 A | 7/2010 |
| JP | 2013-190471 A | 9/2013 |

\* cited by examiner

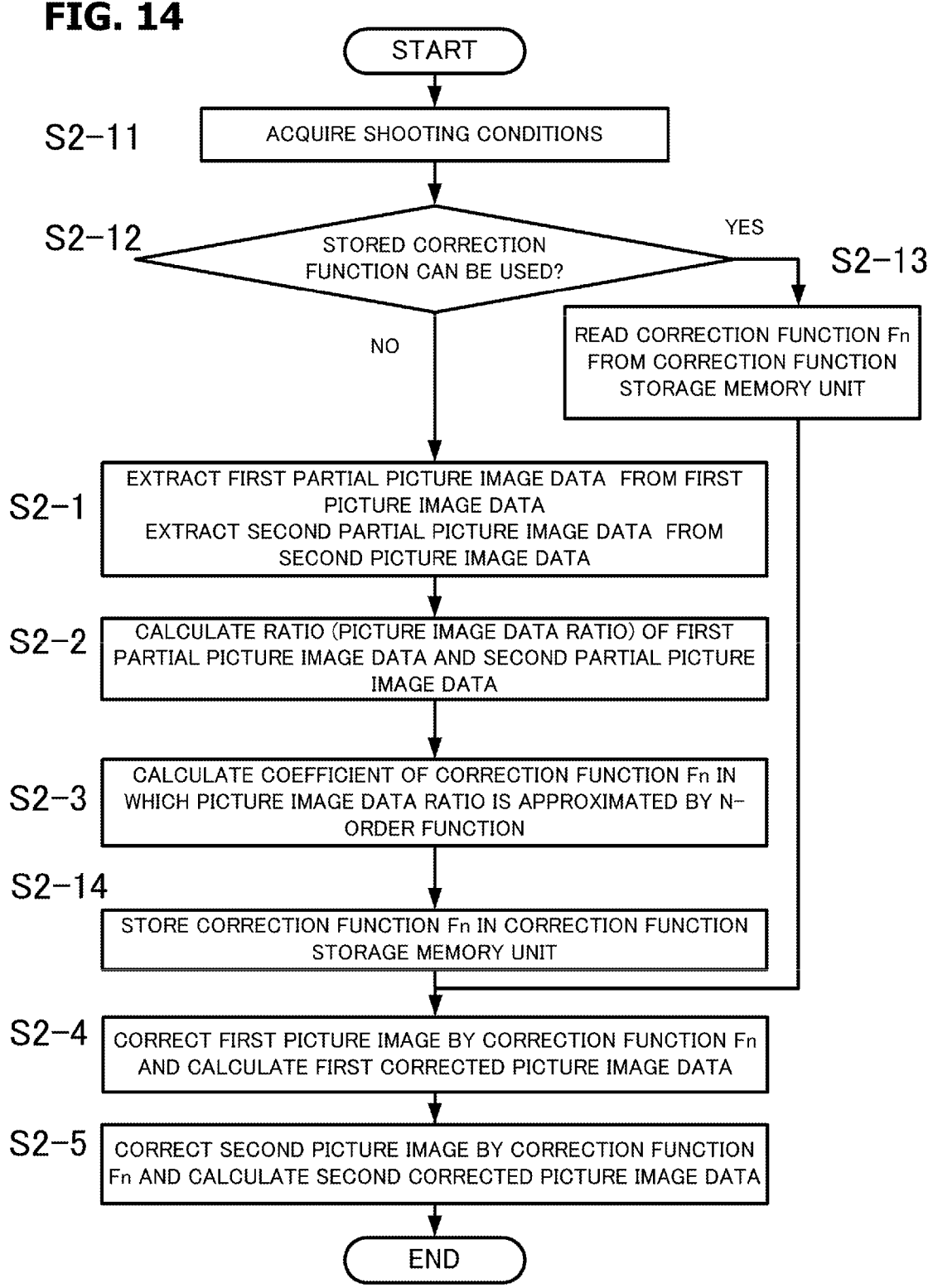

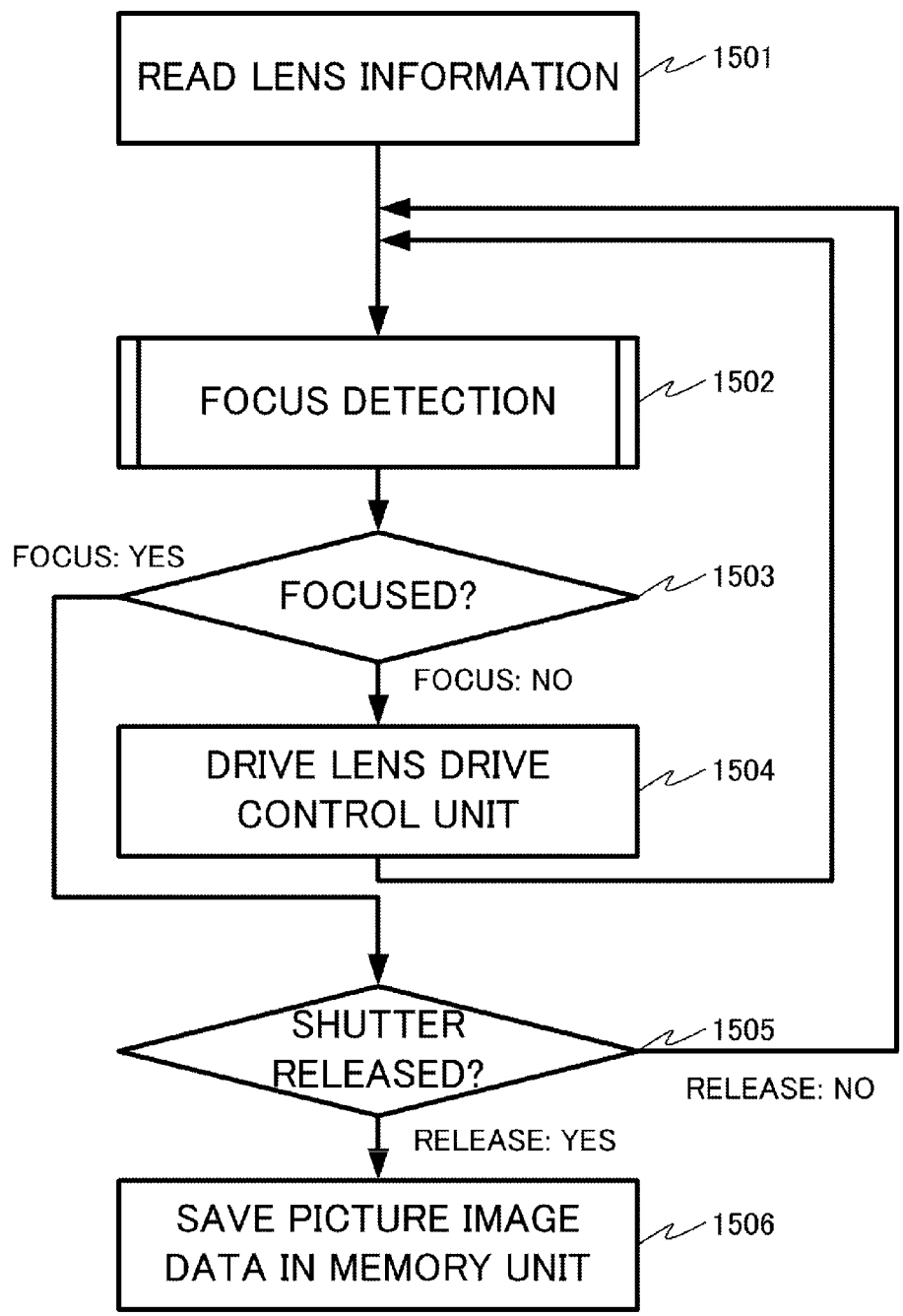

RANGING APPARATUS, IMAGING APPARATUS, AND RANGING METHOD

This is a continuation of U.S. patent application Ser. No. 14/501,612, filed on Sep. 30, 2014.

BACKGROUND OF THE INVENTION

Field of the Invention

The present invention relates to a ranging apparatus, an imaging apparatus, and a ranging method.

Description of the Related Art

Japanese Patent Application Publication No. 2003-244712 suggests a solid-state imaging sensor for a digital still camera or a digital video camera in which pixels having a ranging function (referred to hereinbelow as "ranging pixels") are arranged in the entire imaging sensor or part thereof, and the distance to an object is detected by a phase difference method. The ranging pixels are equipped with a plurality of photoelectric conversion units and configured such that light fluxes that have passed through different regions on a lens pupil are guided to different photoelectric conversion units.

Picture image data (a picture image based on an A-image is referred to hereinbelow as "A-picture image", and a picture image based on a B-image is referred to hereinbelow as "B-picture image") based on optical images (referred to hereinbelow as "A-image" and "B-image"; a combination of those picture images is referred to as "AB-images") generated by light fluxes that have passed through different pupil regions are acquired by using electric signals generated by the photoelectric conversion units included in the ranging pixels. An image shift amount (also referred to as "parallax"), which is a relative position shift amount of the A-picture image and B-picture image, is then calculated.

A large number of techniques for searching for correspondence points in a region base, which is called template matching, is used for calculating the image shift amount. In template matching, an A-picture image or a B-picture image is set as a criterion picture image, and the other picture image, which is different from the criterion picture image, is set as a reference picture image. A criterion region (also referred to as "criterion window") centered on a point of interest is set on the criterion picture image, and a reference region (also referred to as "reference window") is also set with respect to a reference point corresponding to the point of interest on the reference picture image. A reference point in which the correlation between the picture image in the criterion region and the picture image in the reference region reaches a maximum is retrieved, and an image shift amount is calculated using the relative position shift amount of the point of interest and the reference point. Generally, where the size of the search region decreases, local calculations cause a calculation error of the image shift amount. For this reason, a comparative large region size (for example, 9 pixels×9 pixels, or the like) is used.

The distance to an object can be calculated by converting the image shift amount into a defocus amount by using a conversion coefficient. In such a way, since it is not necessary to move a lens in order to measure the distance, as opposed to the conventional contrast method, high-speed and high-accuracy ranging can be performed.

In this case, the ranging accuracy during measurements can be increased by accurately determining the image shift amount. The collapse of the light quantity balance is one of the factors causing an error in the image shift amount. The collapse of the light quantity balance, as referred to herein, is a phenomenon in which the light quantity ratio of the A-image and B-image varies according to the image height due to light flux vignetting, which is caused by the lens frame of a lens, or caused by the angle characteristic of ranging pixel sensitivity.

Japanese Patent Application Publication No. H2-181108 suggests a method in which a correction coefficient that ensures a constant light quantity ratio of the A-image and B-image is calculated by performing uniform irradiation after assembling a lens and an imaging sensor, and picture image data are then corrected using this correction coefficient when calculating the image shift amount.

Japanese Patent Application Publication No. 2009-258231 suggests a method for correcting the collapse of the light quantity balance by correlation computations taking the light quantity ratio of the A-image and B-image into account.

SUMMARY OF THE INVENTION

With the focus detection method disclosed in Japanese Patent Application Publication No. H2-181108, the correction coefficient is measured after assembling the imaging optical system and the imaging sensor. As a result, the correction of the light quantity ratio of the A-image and B-image is not affected by a production error, and the calculation error of the image shift amount can be reduced.

However, recently developed digital cameras are equipped with an optical image stabilizer function, and the optical axis of a lens at the time the correction coefficient is calculated can differ from that at the time of actual imaging. Thus, when a correction coefficient that has been acquired in advance is used, the collapse of the light quantity balance of the A-image and B-image is not necessarily corrected effectively, and the calculation accuracy of the image shift amount can decrease. Further, calculating the correction coefficient after assembling the lens and the imaging sensor adds an adjustment step which can increase the production cost.

With the focus detection method disclosed in Japanese Patent Application Publication No. 2009-258231, the collapse of the light quantity balance is corrected by taking into account the light quantity ratio of the A-image and B-image when calculating the degree of correlation of a picture image in a search region and a picture image in a reference region, and the ranging accuracy is increased by decreasing the calculation error of the image shift amount.

In template matching, an overlapping region is present in the range of a criterion region which is to be set between the adjacent points of interest. In the focus detection method disclosed in Japanese Patent Application Publication No. 2009-258231, the collapse of the light quantity balance of the A-image and B-image is corrected for each calculation of the correlation degree. Therefore, the correction of the light quantity ratio is performed a plurality of times in the overlapping region and the computational volume increases by comparison with the conventional correlation degree calculation. The increase in the computational volume can result in an increased cost due to the extended processing time and the increased scale of computational circuitry. Further, since the collapse of the light quantity balance is corrected with consideration for only the A-image and B-image included in the criterion region, the light quantity balance cannot be accurately corrected due to the effect of noise, such as light shot noise.

Accordingly, it is an objective of the present invention to provide a ranging apparatus in which the collapse of the light quantity balance of the A-image and B-image can be corrected and high-accuracy ranging can be performed with a small computational volume.

A ranging apparatus in accordance with the present invention is configured to calculate a defocus amount on the basis of an image shift amount, which is a relative position shift amount of first picture image data based on a first light flux passing through a first pupil region of an imaging optical system, and second picture image data based on a second light flux passing through a second pupil region of the imaging optical system. The ranging apparatus includes: an output ratio data calculation unit configured to calculate a value of a ratio of an output value of a pixel of the first picture image data and an output value of a pixel of the second picture image data at a corresponding pixel position at a plurality of pixel positions, and to calculate output ratio data which are a set of the values of the ratio; a correction function calculation unit configured to calculate a correction function approximating the output ratio data by an N-order function (N is an integer equal to or greater 1) having a pixel position as a variable; a correction unit configured to correct at least either one of the first picture image data and the second picture image data on the basis of the correction function; and a ranging unit configured to calculate the defocus amount by using the picture image data corrected by the correction unit.

A ranging method in accordance with the present invention is a ranging method executed by a ranging apparatus. The ranging method includes: an image acquisition step of acquiring first picture image data based on a first light flux passing through a first pupil region of an imaging optical system, and second picture image data based on a second light flux passing through a second pupil region of the imaging optical system; an output ratio data calculation step of calculating a value of a ratio of an output value of a pixel of the first picture image data and an output value of a pixel of the second picture image data at a corresponding pixel position at a plurality of pixel positions, and calculating output ratio data which are a set of the values of the ratio; a correction function calculation step of calculating a correction function approximating the output ratio data by an N-order function (N is an integer equal to or greater 1) having a pixel position as a variable; a correction step of correcting at least either one of the first picture image data and the second picture image data on the basis of the correction function; and a ranging step of calculating a defocus amount by using the picture image data corrected in the correction step.

In accordance with the present invention, in a ranging apparatus calculating a distance to an object on the basis of an image shift amount, the image shift amount can be calculated with a high accuracy, and highly accurate ranging can be performed with a small computational volume.

Further features of the present invention will become apparent from the following description of exemplary embodiments with reference to the attached drawings.

BRIEF DESCRIPTION OF THE DRAWINGS

FIG. 14 is a flowchart of light quantity balance correction processing in the second embodiment;
and
FIG. 15 is flowchart showing an operation example of the digital camera.

DESCRIPTION OF THE EMBODIMENTS

Figure 1A:
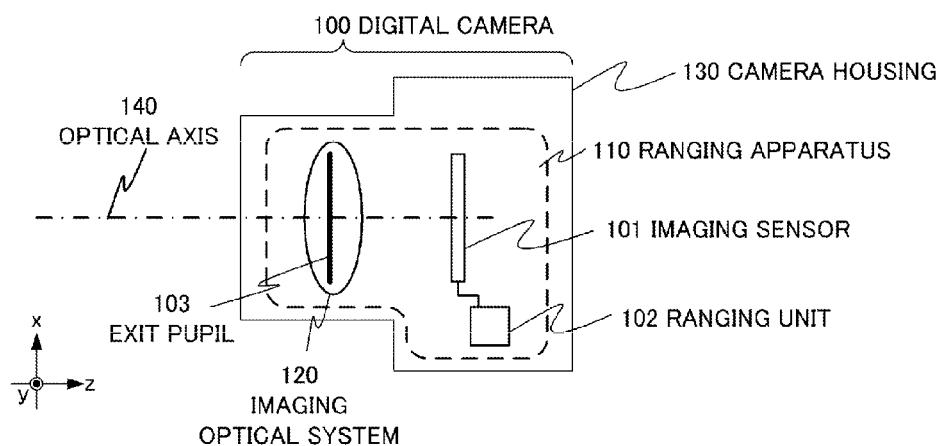
FIGS. 1A and 1B show the configuration of a digital camera according to a first embodiment.

A digital camera is explained hereinbelow as an example of an imaging apparatus equipped with the ranging apparatus in accordance with the present invention, but the application of the present invention is not limited thereto. For example, the ranging apparatus in accordance with the present invention can be also used in a digital ranging device or the like. In the explanation below that refers to the appended drawings, the same segments are assigned with the same reference numerals in different drawings in principle, and the redundant explanation thereof is herein avoided.

First Embodiment

The first embodiment of the present invention will be explained hereinbelow in detail with reference to the drawings.
<Configuration of Digital Camera>
FIG. 1A shows the configuration of a digital camera 100 of the present embodiment. The digital camera 100 is constituted by disposing an imaging optical system 120, an imaging sensor 101, a ranging unit 102, a picture image generating unit (not shown in the figure), and a lens drive control unit (not shown in the figure) inside a camera housing 130. A ranging apparatus 110 is constituted by the imaging optical system 120, the imaging sensor 101, and the ranging unit 102. The ranging unit 102 can be configured using a logical circuit. The ranging unit 102 may be also configured by a central processing unit (CPU) and a memory storing a computational processing program.

The imaging optical system 120 is a lens of the digital camera 100 and has a function of forming an image of an object on the imaging sensor 101, which is an imaging surface. The imaging optical system 120 is constituted by a plurality of lens groups (not shown in the figure), a diaphragm (not shown in the figure), and an optical image stabilizer (not shown in the figure) and has an exit pupil 103 at a position at a predetermined distance from the imaging sensor 101. The optical image stabilizer is constituted by a correction lens equipped with a gyro mechanism and corrects the shaking of an optical axis by moving the correction lens in the direction of canceling the shaking. The reference numeral 140 in FIG. 1A stands for the optical axis of the imaging optical system 120. In the present embodiment, a z axis is parallel to the optical axis 140. An x axis and a y axis are perpendicular to each other and also perpendicular to the optical axis 140.

An operation example of the digital camera 100 is explained hereinbelow. This is, however, merely an example and the present invention is not limited thereto. FIG. 15 shows the flow of the steps of an operation after a main power supply of the digital camera 100 has been switched on and the so-called semi-pushing operation of a shutter button (not shown in the figure) has been performed. Initially, in step 1501, information (focal distance, diaphragm value and the like) on the imaging optical system 120 is read and saved in a memory unit (not shown in the figure). Then, the processing of steps 1502, 1503, and 1504 are performed and focus adjustment is carried out. Thus, in step 1502, a defocus amount is calculated using an object ranging procedure, which will be described hereinbelow with reference to FIG. 3, on the basis of image data outputted from the imaging sensor 101. In step 1503, it is determined whether or not the imaging optical system 120 is in a focused state on the basis of the calculated defocus amount. Where the imaging optical system is not focused, in step 1504, the imaging optical system 120 is driven to the focus position with the lens drive control unit on the basis of the defocus amount, and the processing then returns to step 1502. Where it is determined in step 1503 that the imaging optical system is focused, it is determined in step 1505 whether or not the shutter has been released (the so-called fully pushed state) by the operation of the shutter button (not shown in the figure). Where it is determined that the shutter has not been released, the processing returns to step 1502, and the above-described processing is repeated. Where it is determined in step 1505 that the shutter has been released, picture image data are read from the imaging sensor 101 and saved in the memory unit (not shown in the figure). An ornamental image can be generated by photographic processing of the picture image data saved in the memory unit. An object distance picture image (object distance distribution) corresponding to the ornamental image can be also generated by applying the object ranging processing described hereinbelow with reference to FIG. 3 to the picture image data saved in the memory unit.

<Configuration of Imaging Sensor>

The imaging sensor 101 is constituted by a complementary metal oxide semiconductor (CMOS) or a charge coupled device (CCD). An object image formed on the imaging sensor 101 through the imaging optical system 120 is photoelectrically converted by the imaging sensor 101, and picture image data based on the object image are generated. The imaging sensor 101 of the present embodiment is explained below in greater detail with reference to FIG. 1B.

Figure 1B:
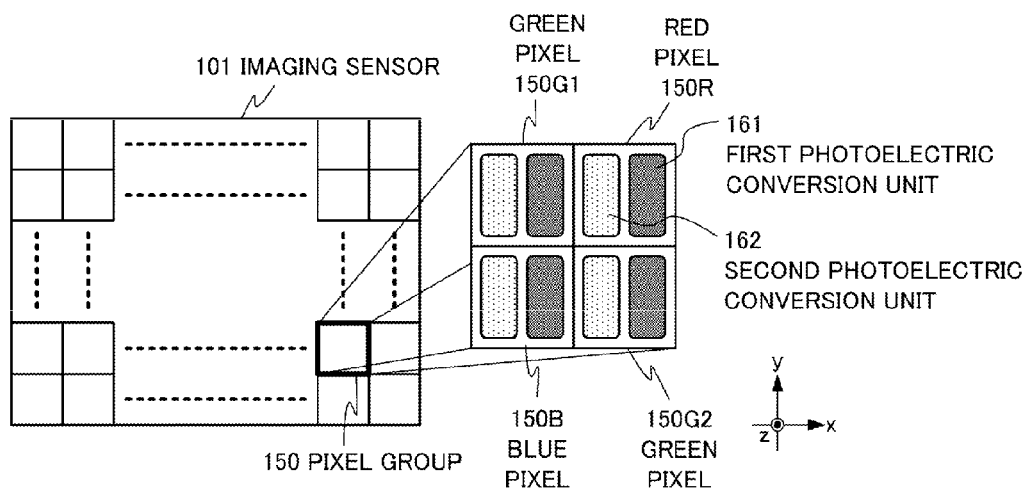

FIG. 1B is an xy cross-sectional view of the imaging sensor 101. The imaging sensor 101 is configured by arranging a plurality of pixel groups 150, each group having a 2 pixel×2 pixel configuration. The pixel group 150 is configured by disposing green pixels 150G1 and 150G2 in a diagonal direction and arranging a red pixel 150R and a blue pixel 150B as other two pixels.

<Explanation of Ranging Principle>

In each pixel constituting the pixel group 150 of the present embodiment, two photoelectric conversion units (161: first photoelectric conversion unit, 162: second photoelectric conversion unit) having a symmetrical cross-sectional shape in the xy cross section are arranged side by side in a light-receiving layer (203 in FIG. 2) in the pixel. The light fluxes received by the first photoelectric conversion unit and the second photoelectric conversion unit in the imaging sensor 101 are explained hereinbelow with reference to FIG. 2.

Figure 2:
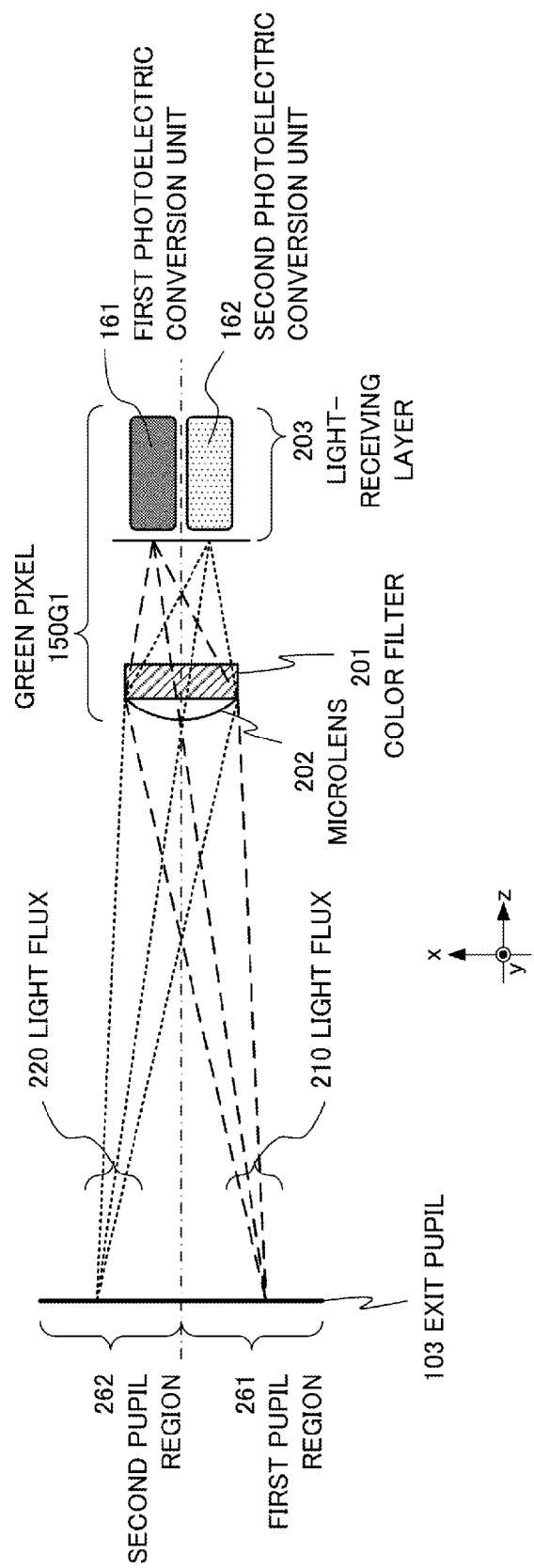
FIG. 2 illustrates the light flux received by a photoelectric conversion unit in the first embodiment.

FIG. 2 is a schematic diagram showing the exit pupil 103 of the imaging optical system 120 and only the green pixel 150G1 as a representative example of the pixels disposed in the imaging sensor 101. The pixel 150G1 shown in FIG. 2 is constituted by a color filter 201, a microlens 202, and a light-receiving layer 203; the first photoelectric conversion unit 161 and the second photoelectric conversion unit 162 are included in the light-receiving layer 203. The microlens 202 is disposed such that the exit pupil 103 and the light-receiving layer 203 are in a conjugate relationship. As a result, as shown in FIG. 2, a light flux 210 that has passed through a first pupil region 261 in the exit pupil 103 is incident upon the first photoelectric conversion unit 161, and a light flux 220 that has passed through a second pupil region 262 is incident upon the second photoelectric conversion unit 162.

The plurality of first photoelectric conversion units 161 provided in the pixels photoelectrically converts the received light flux and generates first picture image data. Likewise, the plurality of second photoelectric conversion units 162 provided in the pixels converts the received light flux and generates second picture image data. An intensity distribution of the image (A-image) formed on the imaging sensor 101 by the light flux that has mainly passed through the first pupil region can be obtained from the first picture image data, and an intensity distribution of the image (B-image) formed on the imaging sensor 101 by the light flux that has mainly passed through the second pupil region can be obtained from the second picture image data. Therefore, the relative position shift amount of the first picture image data and the second picture image data is the image shift amount of the A-image and the B-image. The distance to the object can be calculated by calculating this image shift amount by the below-described method and converting the image shift amount into the defocus amount by using a conversion coefficient.

<Explanation of Ranging Procedure>

Figure 3:
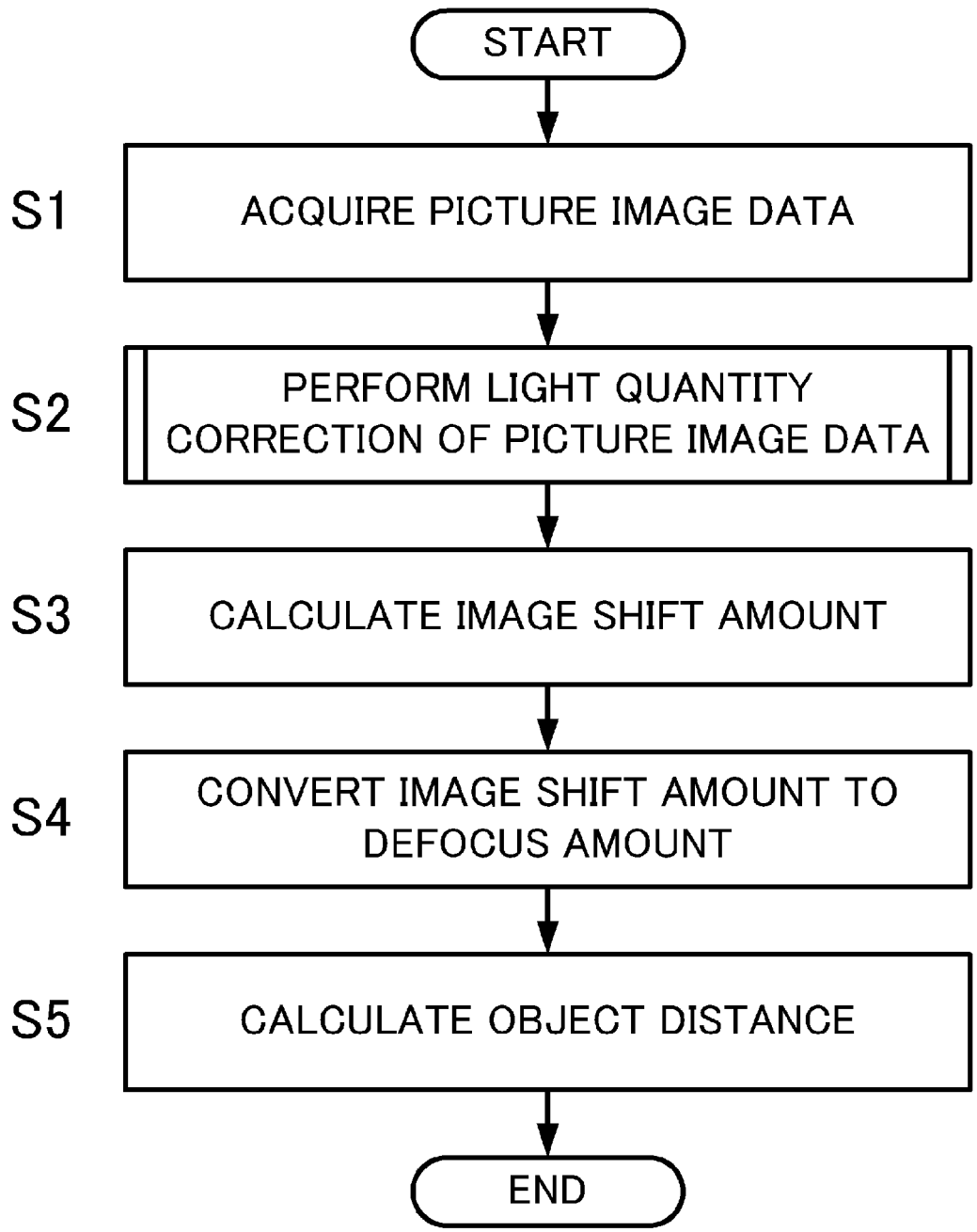
FIG. 3 is a flow chart of the ranging procedure in the first embodiment.

The ranging procedure performed by the ranging unit 102 of the present embodiment will be explained below in greater detail with reference to FIG. 3.

In step S1, the imaging sensor 101 acquires the first picture image data and the second picture image data and transfers the acquired data to the ranging unit 102 (picture image acquisition processing).

In step S2, light quantity balance correction processing is performed for correcting the collapse of the light quantity balance on the basis of the first picture image data and the second picture image data. The light quantity balance correction processing performed in step S2 is explained hereinbelow with reference to FIG. 7.

Figure 4:
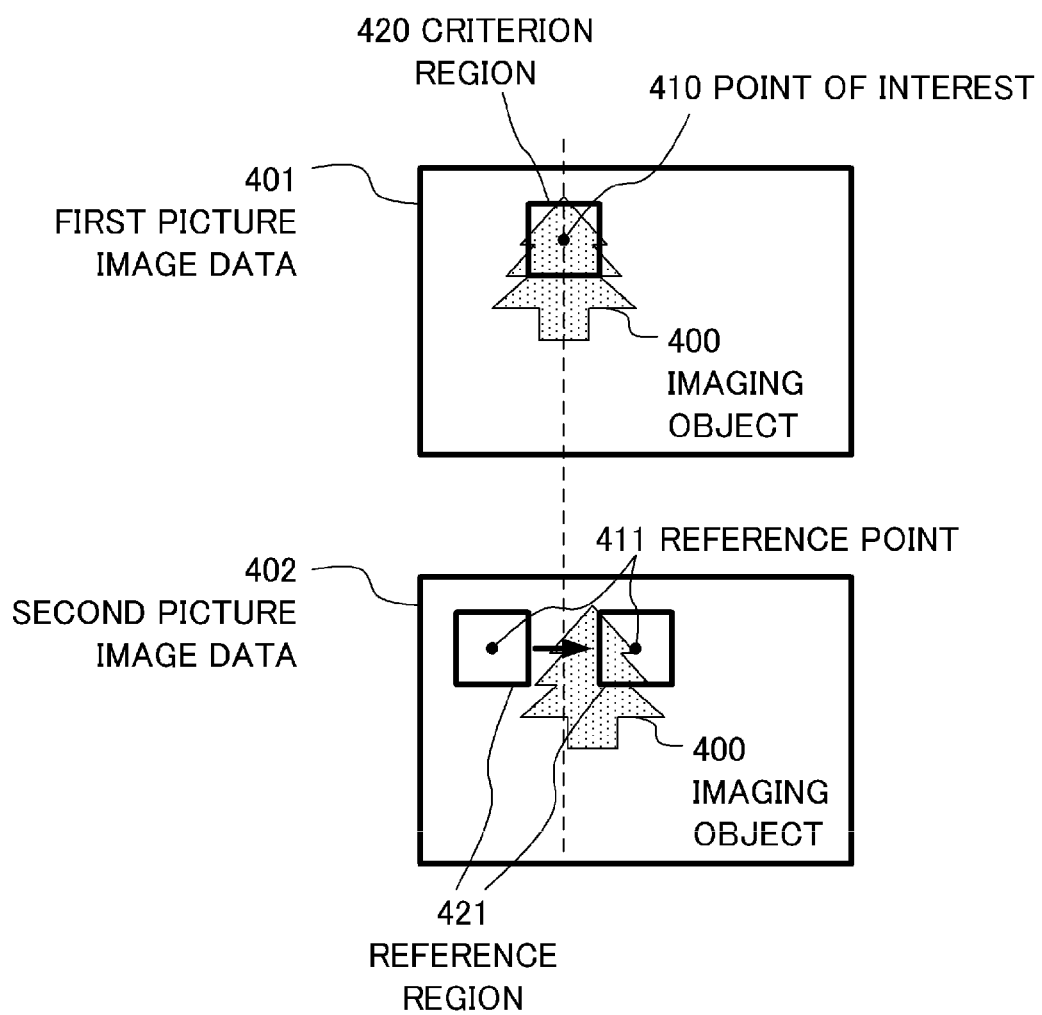
FIG. 4 illustrates a method for calculating the image shift amount in the first embodiment.

In step S3, the image shift amount is calculated on the basis of the first picture image data and the second picture image data. A method for calculating the image shift amount is explained with reference to FIG. 4. FIG. 4 illustrates the method for calculating the image shift amount and shows first picture image data 401, second picture image data 402, and an imaging object 400. A point 410 of interest is set with respect to the first picture image data, and a criterion region 420 is set to be centered on the point 410. Meanwhile, a reference point 411 is set at a position corresponding to the point 410 of interest with respect to the second picture image data, and a reference region 421 is set to be centered on the reference point 411. A correlation value of the first picture image data in the criterion region 420 and the second picture image data in the reference region 421 is calculated while successively moving the reference point 411 in a predetermined image shift amount search range, and the reference point 411 with the highest correlation is taken as a corresponding point for the point 410 of interest. The image shift amount search range may be determined from the maximum distance and the minimum distance that are wished to be calculated. For example, the maximum distance may be set to infinity, the minimum distance may be set to the minimum imaging distance of the imaging optical system 120, and the range of the maximum image shift amount and minimum image shift amount, which are to be determined from the maximum distance and minimum distance, respectively, may be taken as the image shift amount search range. The relative position shift amount between the point 410 of interest and the corresponding point becomes the image shift amount. By searching for the corresponding point while moving successively the point 410 of interest, it is possible to calculate the image shift amount at each data position (each pixel position) in the first picture image data. A well-known method can be used for calculating the correlation value. For example, a method called SSD can be used by which the sum of squares of the differences between the picture image data in the criterion region and the picture image data in the reference region is taken as an estimation value.

Figure 5A:
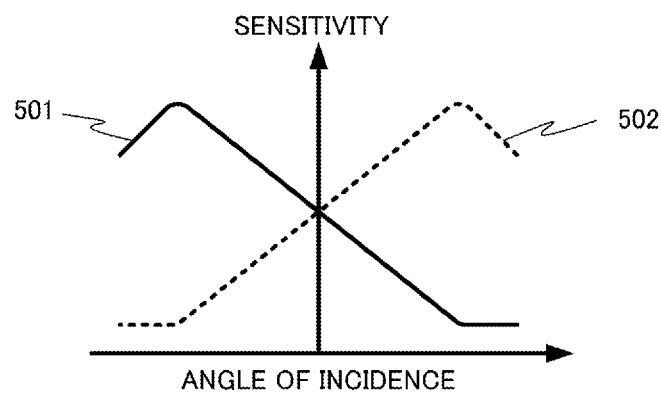
FIGS. 5A and 5B illustrate a method for calculating a conversion coefficient in the first embodiment.
Figure 5B:
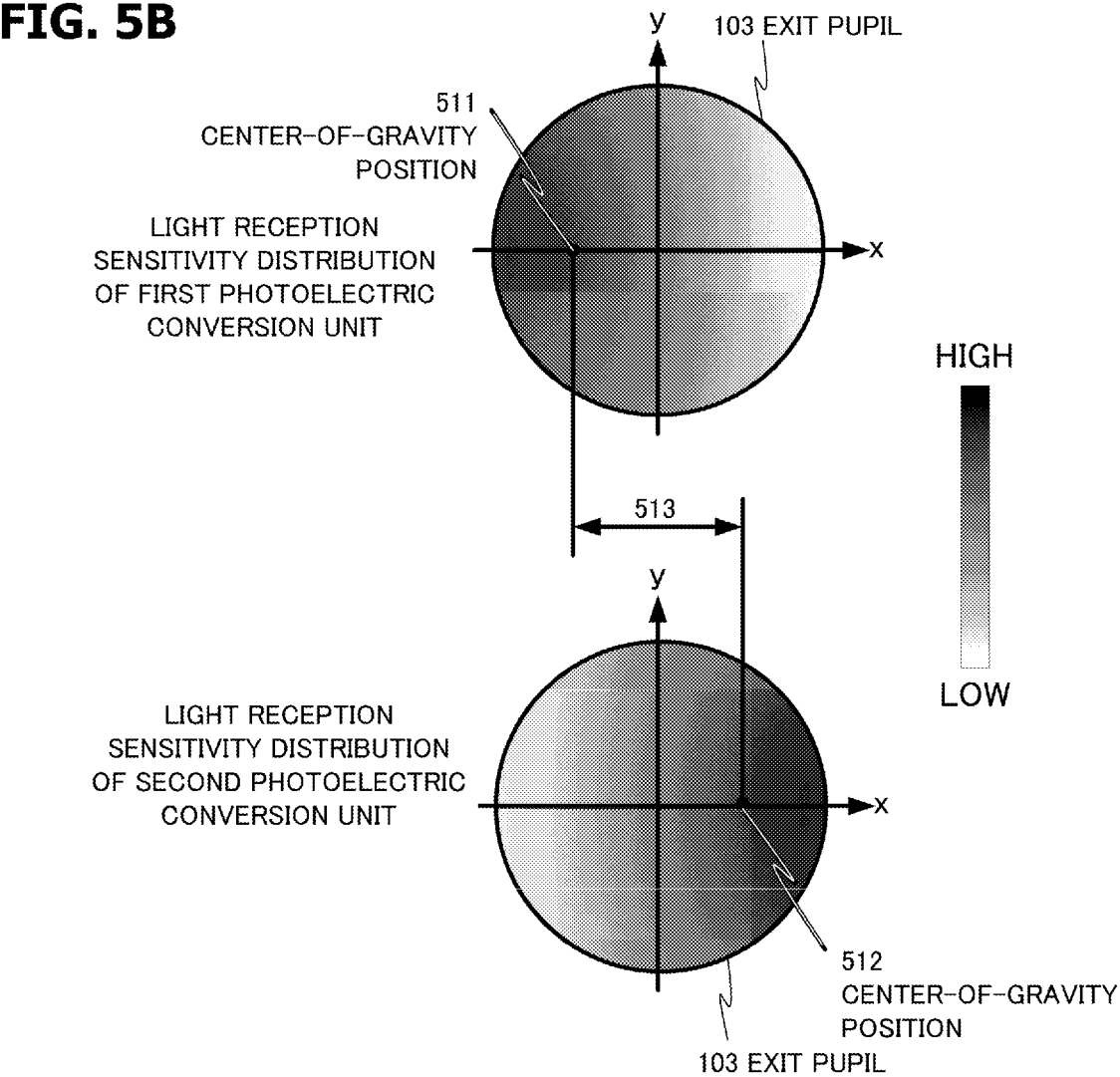

In step S4, the image shift amount is converted into an image-side defocus amount by using a conversion coefficient (defocus amount calculation processing). A method for calculating the conversion coefficient is explained using FIGS. 5A and 5B. FIG. 5A depicts the dependence of the light reception sensitivity on the angle of incidence in a pixel. The angle of incidence (the angle formed by the z axis and the light beam projected on the xz plane) of the light incident on a pixel is plotted against the abscissa, and the light reception sensitivity is plotted against the ordinate. The solid line 501 represents the light reception sensitivity of the first photoelectric conversion unit 161, and the broken line 502 represents the light reception sensitivity of the second photoelectric conversion unit 162. In FIG. 5B, the light reception sensitivity is projected on the exit pupil 103 and represented as a light reception sensitivity distribution on the exit pupil 103. It is clear that the light reception sensitivity gets higher as the color gets denser. FIG. 5B depicts a center-of-gravity position 511 of the light reception sensitivity distribution of the first photoelectric conversion unit, and a center-of-gravity position 512 of the light reception sensitivity distribution of the second photoelectric conversion unit. The distance 513 between center-of-gravity position 511 and the center-of-gravity position 512 is called the base line length and used as a conversion coefficient for converting the image shift amount into the image-side defocus amount. Where the image shift amount is denoted by r, the base line length is denoted by w, and the pupil distance from the imaging sensor 101 to the exit pupil 103 is denoted by L, the image-side defocus amount ΔL can be obtained by converting the image shift amount into the image-side defocus amount by using Equation (1).

[Eq. 1]

$$\Delta L = \frac{r \cdot L}{w - r} \quad \text{(Equation 1)}$$

The image shift amount may be also converted into the image-side defocus amount by using a method other than that represented by Equation (1). For example, a gain value Gain may be calculated with Equation (2) by assuming that the base line length w in Equation (1) is sufficiently large in comparison with the image shift amount r, and the image shift amount may be converted into the image-side defocus amount on the basis of Equation (3).

[Eq. 2]

$$\text{Gain} = L/w \quad \text{(Equation 2)}$$

[Eq. 3]

$$\Delta L = \text{Gain} \cdot r \quad \text{(Equation 3)}$$

The conversion of the image shift amount into the image-side defocus amount can be easily performed by using Equation (3), and the computational volume relating to the calculation of the object distance can be reduced. A look-up table for conversion may be also used for converting the image shift amount into the image-side defocus amount. In this case, the computational volume relating to the calculation of the object distance can be also reduced.

In the explanation illustrated by FIG. 2, the first pupil region 261 is taken as a region with a negative x, the second pupil region 262 is taken as a region with a positive x, and the two pupil regions are completely separated from each other. However, since the light that has reached the light-receiving layer 203 actually has a certain spread due to the light diffraction phenomenon, there is a region in which the first pupil region 261 and the second pupil region 262 overlap, so that the light reception sensitivity distribution depicted in FIG. 5B is obtained. In the explanation of the present embodiment, the first pupil region 261 and the second pupil region 262 are assumed to be clearly separated from each other for the sake of convenience.

In step S5, the image-side defocus amount calculated in step S4 is converted into the object distance on the basis of the imaging relationship of the imaging optical system (object ranging processing). The conversion to the object distance may be also performed by another method. For example, the image-side defocus amount may be converted into the object-side defocus amount, and the distance to the object may be calculated by the sum of the object-side defocus amount and the object-side focus position calculated on the basis of the focal distance of the imaging optical system 120. The object-side defocus amount can be calculated using the image-side defocus amount and the longitudinal magnification of the imaging optical system 120.

In the ranging procedure of the present embodiment, the image shift amount is converted into the image-side defocus amount in step S4, and then the image-side defocus amount is converted into the object distance in step S5. However, as mentioned hereinabove, the image-side defocus amount and the object-side defocus amount, or the image-side defocus amount and the object distance can be converted using the imaging relationship of the imaging optical system 120. Therefore, the image shift amount may be directly converted into the object-side defocus amount or the object distance, without using the step S4 and/or step S5 of the present embodiment. In either case, the defocus amount (image-side and/or object-side) or the object distance can be calculated with good accuracy by accurately calculating the image shift amount.

Further, in the present embodiment, the image-side defocus amount is converted into the object distance in step S5, but it is not always necessary to perform step S5, and the ranging procedure may be ended at step S4. The amount of blurring of the object in the ornamental picture image depends on the image-side defocus amount, and a more blurred picture image is captured when the object has a large image-side defocus amount. In the refocus processing for adjusting the focus position by processing such a picture image, the conversion to the object distance is not required and the image-side defocus amount is sufficient.

<Causes of Collapse of Light Quantity Balance>

The causes of the collapse of the light quantity balance are explained below.

Figure 6A:
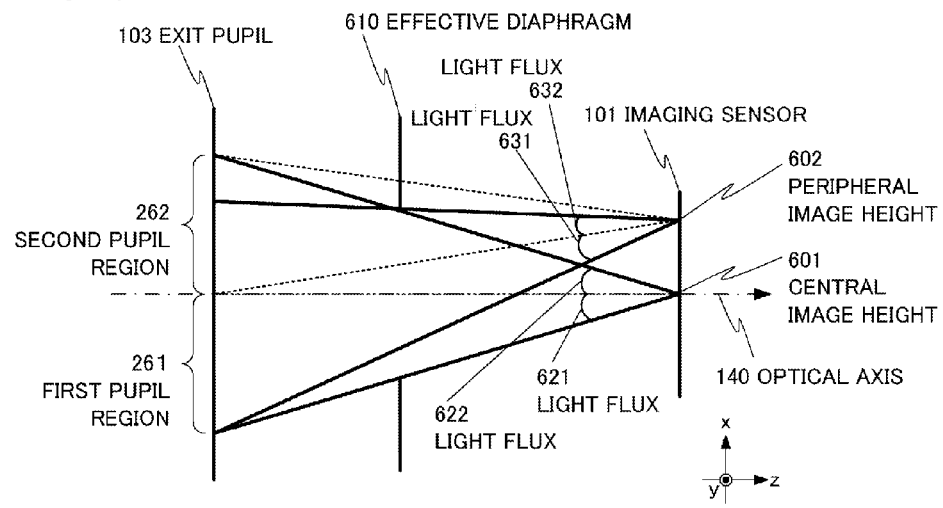
FIGS. 6A and 6B illustrate the light quantity received by the photoelectric conversion unit.

The light quantity 1 received by the first photoelectric conversion unit 161 and the light quantity 2 received by the second photoelectric conversion unit 162 vary depending on the image height due to the vignetting of the imaging optical system 120, and the received light quantity typically decreases in the peripheral regions of the imaging sensor 101. FIG. 6A illustrates the vignetting of the light flux received by the first photoelectric conversion unit 161 and the light flux received by the second photoelectric conversion unit 162. The first photoelectric conversion unit 161 receives the light flux that has passed through the first pupil region 261 on the exit pupil 103 of the imaging optical system 120, and the second photoelectric conversion unit 162 receives the light flux that has passed through the second pupil region 262 on the exit pupil 103 of the imaging optical system 120.

For a light flux 621 and a light flux 622 received by the first photoelectric conversion unit 161 and the second photoelectric conversion unit 162, which are positioned at a central image height 601, vignetting occurs symmetrically with respect to the optical axis 140. Therefore, the ratio of the light quantity 1 and the light quantity 2 becomes 1 (light quantity balance does not collapse).

By contrast, for a light flux 631 and a light flux 632 received by the first photoelectric conversion unit 161 and the second photoelectric conversion unit 162, which are positioned at a peripheral image height 602, vignetting occurs asymmetrically with respect to the optical axis 140 due to an effective diaphragm 610. Therefore, the ratio of the light quantity 1 and the light quantity 2 does not become 1 (light quantity balance collapses).

Figure 6B:
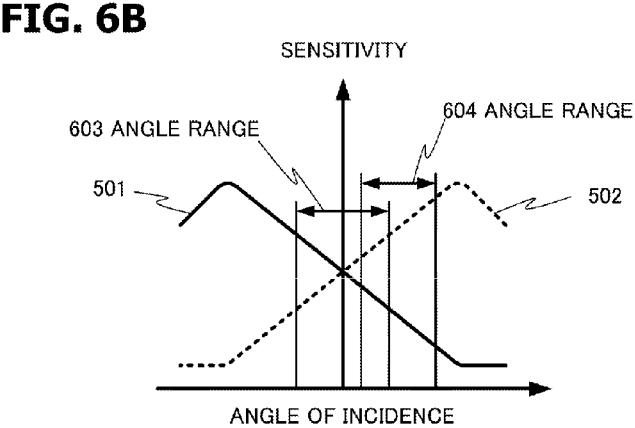

The collapse of the light quantity balance also occurs because the first photoelectric conversion unit 161 and the second photoelectric conversion unit 162 have a sensitivity characteristic with a high dependence on the angle of incidence, as shown in FIG. 5A. FIG. 6B depicts the characteristic of the light reception sensitivity versus the angle of incidence of pixels in the same manner as in FIG. 5A and serves to illustrate the angle range of the light flux received at the central image height 601 and the peripheral image height 602.

At the central image height 601, the main light beam of the light flux constituted by the light flux 621 and the light flux 622 is parallel to the optical axis. Therefore, the first photoelectric conversion unit 161 and the second photoelectric conversion unit 162 receive the light flux in the angle range 603. In the angle range 603, the ratio of the integration value (integration value in the angle range 603) of a solid line 501 representing the light reception sensitivity of the first photoelectric conversion unit 161 to the integration value (integration value in the angle range 603) of a broken line 502 representing the light reception sensitivity of the second photoelectric conversion unit 162 is equal to 1. Thus, the light quantity balance does not collapse.

By contrast, at the peripheral image height 602, the main light beam of the light flux constituted by the light flux 631 and the light flux 632 is not parallel to the optical axis, and the first photoelectric conversion unit 161 and the second photoelectric conversion unit 162 receive the light flux in an angle range 604. In the angle range 604, the ratio of the integration value (integration value in the angle range 604) of the solid line 501 representing the light reception sensitivity of the first photoelectric conversion unit 161 to the integration value (integration value in the angle range 604) of the broken line 502 representing the light reception sensitivity of the second photoelectric conversion unit 162 is not equal to 1. Thus, the light quantity balance collapses.

In the digital camera 100 of the present embodiment, the light quantity balance collapses, that is, the ratio of the light quantity 1 and the light quantity 2 at the peripheral image height is not equal to 1, under the effect of vignetting of the imaging optical system 120 and the dependence of the photoelectric conversion units on the angle of incidence.

In the calculation processing of the image shift amount in step S3, the correction (that is, the degree of similarity) between the criterion region 420 and the reference region 421 is estimated. Therefore, when the light quantity balance collapses, the correlation is estimated to be high in the erroneous reference point 411 and an error occurs in the calculated image shift amount.

<Detailed Explanation of Light Quantity Balance Correction Processing>

Figure 7:
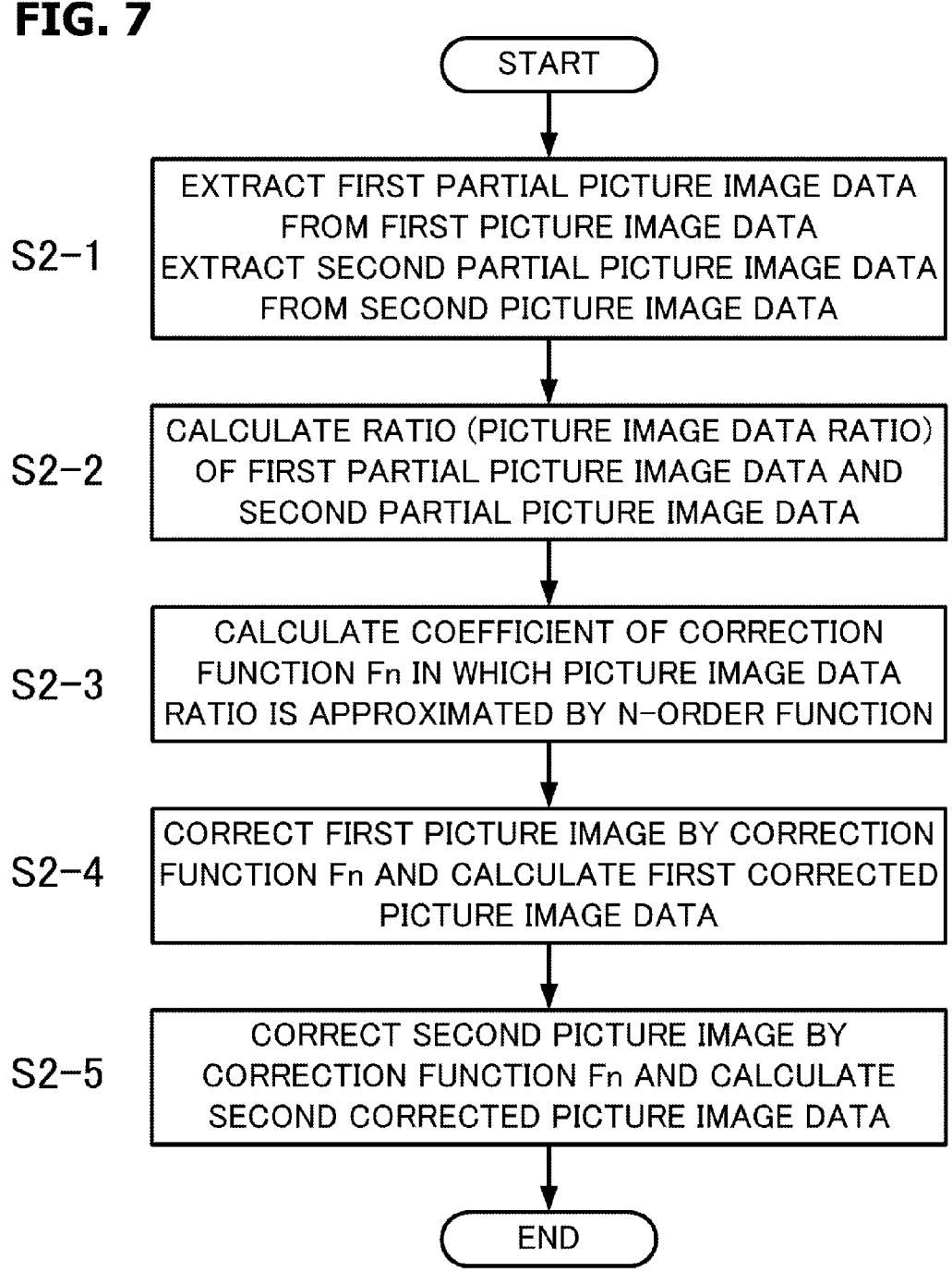
FIG. 7 is a flowchart of light quantity balance correction processing in the first embodiment.

The processing of correcting the collapse of the light quantity balance of the first picture image data and the second picture image data (light quantity balance correction processing) will be described below in greater detail with reference to FIG. 7 and FIGS. 8A to 8E. FIG. 7 is a flowchart of the light quantity balance correction processing in the present embodiment. FIGS. 8A to 8E illustrate the light quantity balance correction processing in the present embodiment.

Figure 8A:
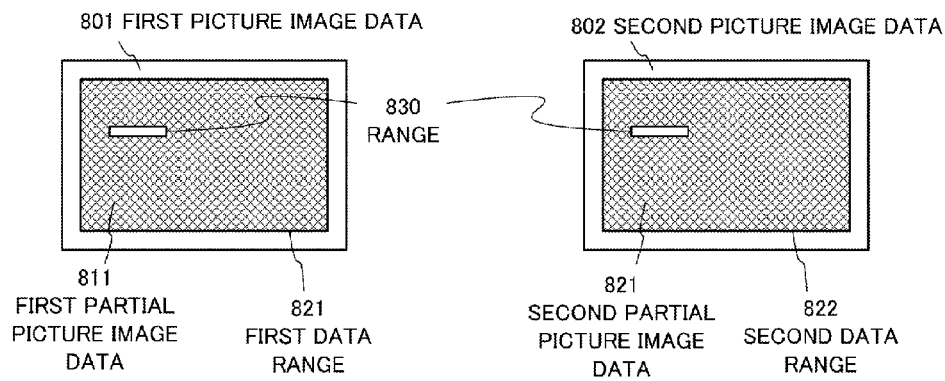
FIGS. 8A to 8E illustrate the light quantity balance correction processing in the first embodiment.
Figure 8B:
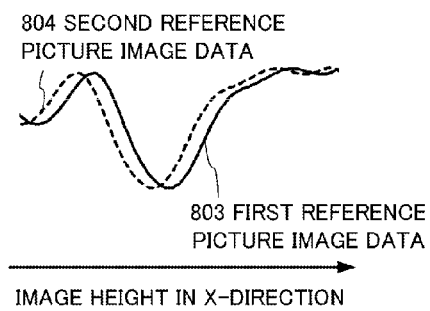
Figure 8C:
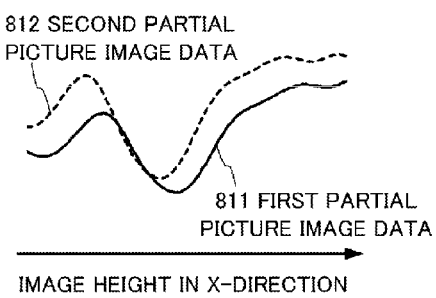

In step S2-1, the first partial picture image data are extracted from the first picture image data, and the second partial picture image data are extracted from the second picture image data. As shown in FIG. 8A, the first picture image data contained in a first data range 821 are extracted from first picture image data 801 and taken as first partial picture image data 811. Likewise, the second picture image data contained in a second data range 822 are extracted from second picture image data 802 and taken as second partial picture image data 812. The second data range is set to a position corresponding to the first data range in the first picture image data (the position of the first data range in the first picture image data and the position of the second data range in the second picture image data are relatively the same position). FIG. 8B shows the first picture image data at the time the light quantity balance has not collapsed as first reference picture image data (solid line 803), and shows the second image data at the time the light quantity balance has not collapsed as second reference picture image data (broken line 804). The image height (pixel position) in the x direction is plotted against the abscissa, and the figure illustrates only a partial range 830 in FIG. 8A. In FIG. 8B, since the light quantity balance has not collapsed, the positions of the first reference picture image data and the second reference picture image data are shifted relative to each other in the x direction. Meanwhile, FIG. 8C depicts the first partial picture image data and the second partial picture image data included in the range 830 in FIG. 8A. The comparison of FIG. 8B and FIG. 8C demonstrates that the collapse of the light quantity balance decreases the data value of the first partial picture image data. Where the image shift amount calculation processing of step S3 is performed without correcting the collapse of the light quantity balance, the correlation is determined to be high in an erroneous reference point and an error occurs in the calculated image shift amount.

In the present embodiment, the first data range 821 is restricted to the partial range of the first picture image data 801, but the first data range 821 may be also be set to the entire range of the first picture image data 801. It is desirable that the first data range 821 be set to the entire range of the first picture image data 801 because the number of data that will be used for calculating the correction function in the below-described step S2-3 can be increased and the approximation error can be reduced.

In step S2-2, the value of the ratio of the output values of pixels at corresponding pixel positions of the first partial picture image data and the second partial picture image data is calculated at each pixel position in either partial picture image data and the processing of calculating the output ratio data, which are the assembly of the ratio values, is performed (output ratio data calculation processing). Where the first partial picture image data are denoted by Pimg1, the second partial picture image data are denoted by Pimg2, and the output ratio data are denoted by Rimg, the output ratio data Rimg can be calculated by Equation 4.

[Eq. 4]

$$Rimg(xp,yp)=Pimg1(xp,yp)/Pimg2(xp,yp) \quad \text{(Equation 4)}$$

In the equation, xp represents a coordinate value in the direction corresponding to the x direction in the partial picture image data, and yp represents a coordinate value in the direction corresponding to the y direction in the partial picture image data. In other words, Equation (4) represents the value of the ratio of the output values of the signals between the pixels located at the same coordinates (xp, yp).

In step S2-3, the calculation processing of the correction function Fn approximating the output ratio data Rimg is performed. In the present embodiment, the correction function Fn is calculated by a least squares method. Thus, the coefficients in an N-order polynomial (N-order function) using an image height (x and/or y) as a variable are calculated by the least squares approximation, and the correction function Fn represented by the N-order function having those coefficients and using the image height (pixel position) as a variable is used. The correction function Fn can be calculated not only by the least squares method, but also by a spline method. Further, N may have any value, provided it is an integer equal to or greater than 1. Since the computational volume of the correction function calculation processing increases as the value of N increases, an adequate N may be used by comparing the necessary accuracy with the computational volume. Since sufficiently accurate correction of the light quantity balance is performed even at N=5, an integer equal to or less than 5 may be used as N. Further, since the output ratio data Rimg is an odd function, from the standpoint of the computational volume, it is preferred that an odd natural number be used as N. In the present invention, only one set of output ratio data Rimg is calculated from one set of the first picture image data and the second picture image data, but by correcting the output ratio data Rimg with the N-order function, it is possible to reduce the effect produced by the image shift between the first picture image data and the second picture image data on the output ratio data. As a result, even though only one set of output ratio data is calculated, the light quantity balance can be sufficiently corrected. Further, since only one set of output ratio data Rimg is calculated, no overlapping region appears during the computations, and high-speed processing can be performed.

More specifically, the processing performed when N=1 will be explained below by way of example. In the imaging sensor 101 of the present embodiment, the first photoelectric conversion unit 161 and the second photoelectric conversion unit 162 are arranged side by side in the x direction. Therefore, in the ranging apparatus 110 of the present embodiment, the relative position shift (image shift) of the A-image (the object image constituting the first picture image data) and the B-image (the object image constitution the second picture image data) occurs in the x direction. With this in mind, the collapse of the light quantity balance mainly occurs in the x direction. Therefore, in the present embodiment, the correction function Fn is represented as a function in the x direction by Equation (5).

[Eq. 5]

$$Fn(x,y)=a(y)x+b(y) \quad \text{(Equation 5)}$$

In this case, a(y) and b(y) may be calculated for each y coordinate so that the differential sum of squares of Rimg and Fn reaches a minimum. It is also possible to calculate the coefficients a(y) and b(y) as constants, which do not depend on the y coordinate, instead of calculating them for each y coordinate.

As another form of the correction function, the correction function Fn may be represented as a function in the x direction and y direction. For example, when the correction function is represented by a third-order function, it may be represented by Equation (6) and each coefficient may be calculated using a well-known least squares method. In this case, the calculations may be also performed in a form such that the correction function Fn does not depend on the y coordinate.

[Eq. 6]

$$Fn(x,y)=a_1x^3+a_2x^2y+a_3xy^2+a_4y^3+b_1x^2+b_2xy+b_3y^2+c_1x+c_2y+d \quad \text{(Equation 6)}$$

A well-known type of the least squares method can be used. For example, a QR decomposition method or singular value analysis can be used. Further, in order to reduce the effect of noise such as light shot noise, the correction function Fn may be calculated after subjecting the output ratio data Rimg to well-known smoothing filtering. A moving average filter or a Gaussian filter can be used for smoothing filtering.

Figure 8D:
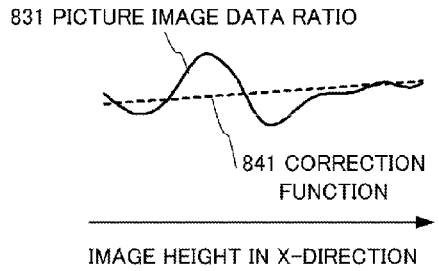

FIG. 8D illustrates steps S2-2 and S2-3. The solid line 831 in FIG. 8D represents the output ratio data Rimg in the range 830 which have been calculated according to Equation (4). The broken line 841 is the correction function Fn in the range 830 which has been calculated in step S2-3 with N=3. The image height in the x direction is plotted against the abscissa. The output ratio data is a data row having a spread, but the correction function in which the effect of the spread is reduced can be obtained by approximating the output ratio data with an N-order function.

In step S2-4, the processing of correcting the first picture image data is performed using the correction function Fn. The first corrected picture image data, which are represented hereinbelow by Cimg1$(x, y)$, are picture image data obtained by correcting the first picture image data by using the correction function Fn. Likewise, the first picture image data are represented by Img1$(x, y)$. In the present embodiment, the first corrected picture image data Cimg1 are calculated by multiplying the first picture image data Img1 by a function obtained by adding 1 to the inverse number of the correction function Fn (1+1/Fn: first picture image data correction function), as shown in Equation (7).

[Eq. 7]

$$Cimg1(x,y) = Img1(x,y) \times \{1 + 1/Fn(x,y)\} \quad \text{(Equation 7)}$$

In step S2-5, the processing of correcting the second picture image data is performed using the correction function Fn. The second corrected picture image data, which are represented hereinbelow by Cimg2$(x, y)$, are picture image data obtained by correcting the second picture image data by using the correction function Fn. Likewise, the second picture image data are represented by Img2$(x, y)$. In the present embodiment, the second corrected picture image data Cimg2 are calculated by multiplying the second picture image data Img2 by a function obtained by adding 1 to the correction function Fn (1+Fn: second picture image data correction function), as shown in Equation (8).

[Eq. 8]

$$Cimg2(x,y) = Img2(x,y) \times \{1 + Fn(x,y)\} \quad \text{(Equation 8)}$$

Figure 8E:
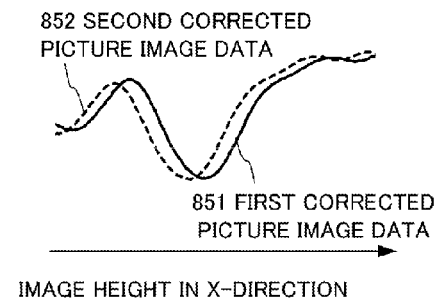

FIG. 8E illustrates steps S2-4 and S2-5. The solid line 851 in FIG. 8E represents the first corrected picture image data Cimg1 in the range 830 which have been calculated according to Equation (7). The broken line 852 represents the second corrected picture image data Cimg2 in the range 830 which have been calculated according to Equation (8). The image height in the x direction is plotted against the abscissa. The collapse of the light quantity balance can be corrected by using the light quantity balance correction processing of the present embodiment on the basis of comparison of FIG. 8E and FIG. 8B. In step S3 (FIG. 3), the image shift amount is calculated using the first corrected picture image data Cimg1 and the second corrected picture image data Cimg2 for which the light quantity balance has thus been corrected.

In the light quantity balance correction processing of the above-described steps S2-1 to S2-5, the correction function is calculated on the basis of a ratio (output ratio data) of the first partial picture image data and the second partial picture image data extracted from the first picture image data and the second picture image data. Where the attention is focused only on a local region, the output ratio data represent a ratio arising not only from the collapse of the light quantity balance of the first picture image data and the second picture image data, but also from the image shift depending on object distance. However, a plurality of objects (people and background) is disposed in the captured picture image. Since the objects are disposed at different distances and have various spatial frequency components, the output ratio data of the present embodiment become a data row having a spread. In the light quantity balance correction processing of the present embodiment, the effect of the image shift depending on the object distance, which is included in the output ratio data, is moderated by calculating the correction function approximating the output ratio data. As a result, the collapse of the light quantity balance is corrected on the basis of the first picture image data and the second picture image data, without acquiring in advance the data for correcting the light quantity balance. Further, it is also possible to calculate the correction function approximating the output ratio data by focusing the attention on a wide, rather than local, region in the output ratio data. In this case, not only the effect of the image shift depending on the object distance, which is included in the output ratio data, can be moderated, but also the effect of the noise included in the first picture image data and the second picture image data can be moderated. In order to moderate the effect of the image shift depending on the object distance, which is included in the output ratio data, it is desirable that the first data range be made wider than the criterion region 420 used in the image shift amount calculation processing of the aforementioned step S3. It is even more desirable that the first data range be wider than the range obtained by combining the criterion region 420 with a predetermined image shift amount search range. In either case, the effect of the noise caused by local computation can be reduced.

In the light quantity balance correction processing of the present embodiment, the correction function is calculated on the basis of the first image picture data and the second image picture data. Therefore, it is not necessary to acquire data for correction in advance. As a result, the collapse of the light quantity balance can be corrected even when the optical axis of the imaging optical system 120 has been shifted from a predetermined position by the optical image stabilizer. Further, since it is not necessary to measure the correction coefficients for correcting the light quantity balance after the digital camera 100 has been assembled, the number of adjustments steps performed at the production stage can be reduced, and the digital camera 100 can be manufactured at a lower cost.

In the image shift amount calculation processing of step S3, when the corresponding point search is performed while successively moving the point 410 of interest, the criterion regions overlap between the adjacent points of interest. In the object calculation procedure of the present embodiment, since the image shift amount calculation processing of step S3 is performed after the light quantity balance has been corrected in step S2, the object distance can be calculated without performing multiple light quantity balance corrections of the overlapping regions. Therefore, the object distance can be calculated at a small computational volume.

In the object distance calculation procedure of the present embodiment, the erroneous calculation of the image shift amount caused by the collapse of the light quantity balance is reduced by performing the image shift amount calculation processing in step S3 (FIG. 3) on the basis of the first corrected picture image data and second corrected picture image data.

<Variation Example of Light Quantity Balance Correction Processing>

Specific details of the light quantity balance correction processing can be changed with respect to those of the above-described method. For example, the method for calculating the corrected picture image data, which is based on the correction function, and the method for calculating the correction function itself can be changed. First, a variation example of the corrected picture image data calculation processing based on the correction function is described and then a variation example of the correction function calculation processing is explained.

(Variation Example of Corrected Picture Image Data Calculation Method)

In the light quantity balance correction processing of the present embodiment, the first picture image data are corrected in step S2-4, and the second picture image data are corrected in step S2-5. As a variation example of the light quantity balance correction processing of the present embodiment, only the correction of the first picture image data by the first picture image data correction processing is performed, and the second picture image data correction processing may be omitted. In this case, in the first picture image data correction processing, the first corrected picture image data Cimg1 are calculated by multiplying the first picture image data Img1 by the inverse number of the correction function Fn, as shown in Equation (9).

[Eq. 9]

$$Cimg1(x,y)=Img1(x,y)/Fn(x,y) \quad \text{(Equation 9)}$$

When the first corrected picture image data are calculated by the first picture image data correction processing (Equation (9)), the image shift amount calculation processing is performed in step S3 on the basis of the first corrected picture image data and the second picture image data (not corrected), instead of the processing of steps S2-4 and S2-5. In the first picture image data correction processing (Equation (9)), the collapse of the light quantity balance is corrected by matching the light quantity of the first picture image data with the second picture image data.

As another variation example of the present embodiment, only the correction of the second picture image data by the second picture image data correction processing may be performed, and the first picture image data correction processing may be omitted. In the second picture image data correction processing in this case, the second corrected picture image data Cimg2 is calculated by multiplying the second picture image data by the correction function Fn, as shown in Equation (10).

[Eq. 10]

$$Cimg2(x,y)=Img2(x,y) \times Fn(x,y) \quad \text{(Equation 10)}$$

When the second corrected picture image data are calculated by the second picture image data correction processing (Equation (10)) instead of the processing of steps S2-4 and S2-5, the image shift amount calculation processing is performed in step S3 on the basis of the first picture image data (not corrected) and the second corrected picture image data. In the second picture image data correction processing (Equation (10)), the collapse of the light quantity balance is corrected by matching the light quantity of the second picture image data with the first picture image data.

In the above-described variation examples, the collapse of the light quantity balance is corrected by correcting only either of the first picture image data and the second picture image data and matching with the light quantity of the other. By performing the light quantity balance correction processing for only either of the picture image data, it is possible to reduce further the computational volume necessary for correcting the light quantity balance.

(Variation Example 1 of Correction Function Calculation Method)

Figure 9:
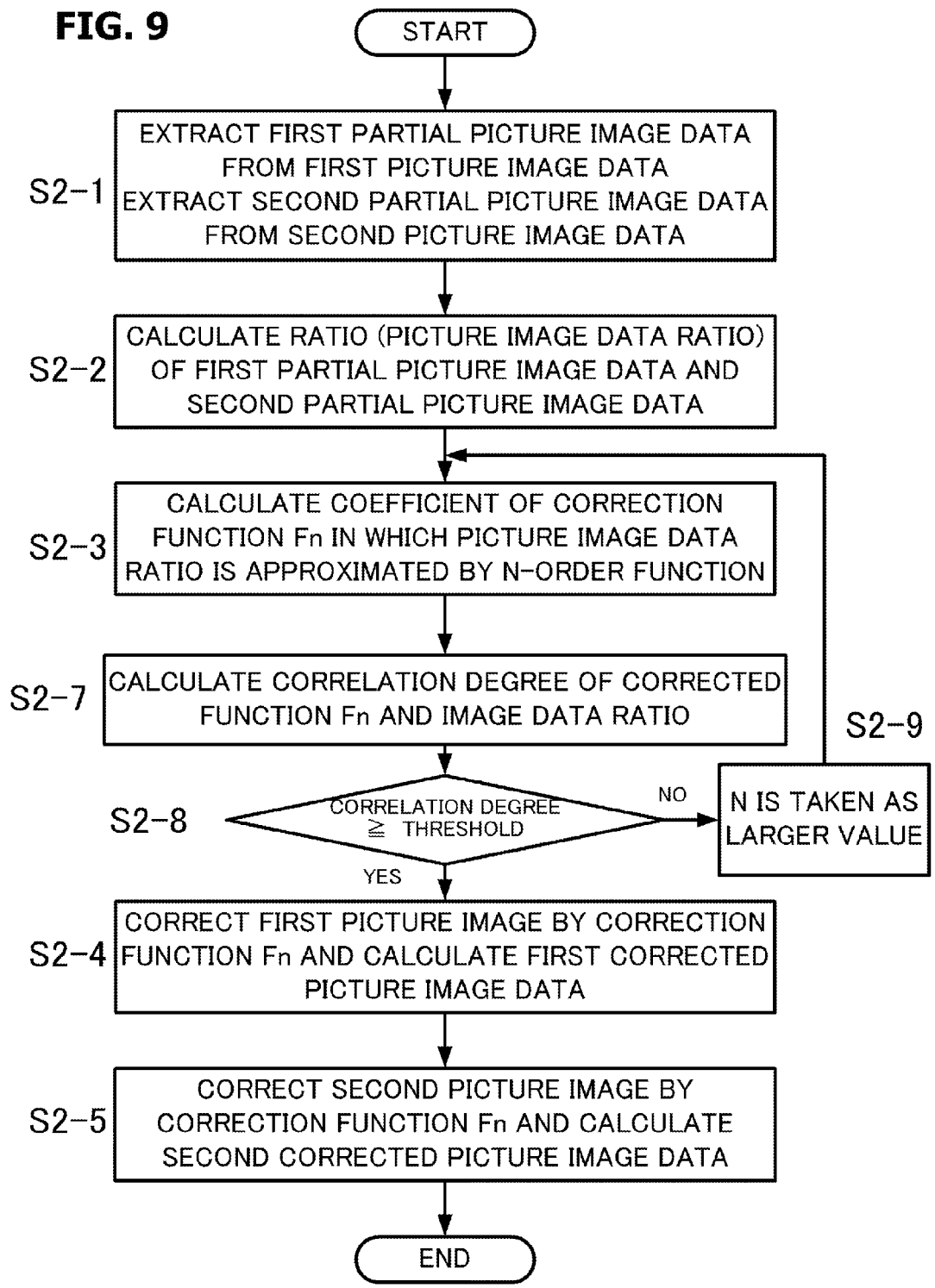
FIG. 9 is a flowchart of light quantity balance correction processing according to a variation example of the first embodiment.

Another form of the light quantity balance correction processing that is partially different from the light quantity balance correction processing explained with reference to FIG. 7 will be explained hereinbelow with reference to FIG. 9. Steps S2-1 to S2-5 in FIG. 9 are the same as explained using FIG. 7. Therefore, only steps S2-7 to S2-9, which represent newly added processing, are explained below.

Step S2-7 is the processing of calculating a correlation degree indicating the degree of similarity between the correction function Fn and the output ratio data Rimg (correlation degree calculation processing). The correlation degree may be a value representing the degree of correlation between two data. For example, a correlation factor, which is a value obtained by dividing the covariance of the correction function Fn and the output ratio data Rimg by the respective standard deviation, can be used. In the ranging apparatus 110 of the present embodiment, where the occurrence of an image shift in the x direction is taken into account, the correlation factor may be calculated for each y coordinate in the same manner as explained with reference to step S2-3.

Step S2-8 is the processing of comparing the correlation degree calculated in step S2-7 with a predetermined correlation degree determination threshold and determining the level of the correlation degree (correlation degree determination processing). Where it is determined that the correlation degree of the correction function Fn and the output ratio data Rimg is less than the correlation degree determination threshold (corresponds to the second threshold), the processing advances to step S2-9, and where it is determined that the correlation degree is equal to or higher than the correlation degree determination threshold (equal to or higher than the second threshold), the processing advances to step S2-4.

The processing of step S2-9 is performed to advance the order of the correction function Fn. Where it is determined in step S2-8 that the correlation degree is low, the approximation error of the correction function Fn is assumed to be large. Therefore, the calculation processing of the correction function Fn in step S2-3 is performed again after changing the order N of the correction function Fn to a larger value in step S2-9. For example, the processing of increasing the order from N to N+1 is performed. In this case, the increase amount of N may be a fixed value (for example, 1 or 2), but it is preferred that the increase width of the order be changed according to the correlation degree calculated in step S2-7. As a result of changing the increase amount according to the correlation degree, the number of times the step S2-3 should be executed to reduce the approximation error of the correction function Fn can be decreased and the computational volume can be reduced. The following method can be used as a specific example of such procedure. When the correlation degree is less than ½ of the threshold for determining the correlation degree in step S2-8, the order N is raised by four (for example, where the order N is 1, the order N is changed to 5, and step S2-3 is executed again). Meanwhile, where the correlation degree is equal to or greater than ½ of the threshold for determining the correlation degree in step S2-8 and less than the threshold, the order N is raised by 2 (for example, where the order N is 1, the order N is changed to 3, and step S2-3 is executed again).

By further performing the processing of steps S2-7 to S2-9, it is possible to reduce the approximation error of the correction function and correct the light quantity balance of the first picture image data and the second picture image data with better accuracy. As a result, the object distance calculation error in the object distance calculation processing of the present embodiment can be reduced.

(Variation Example 2 of Correction Function Calculation Method)

Figure 10:
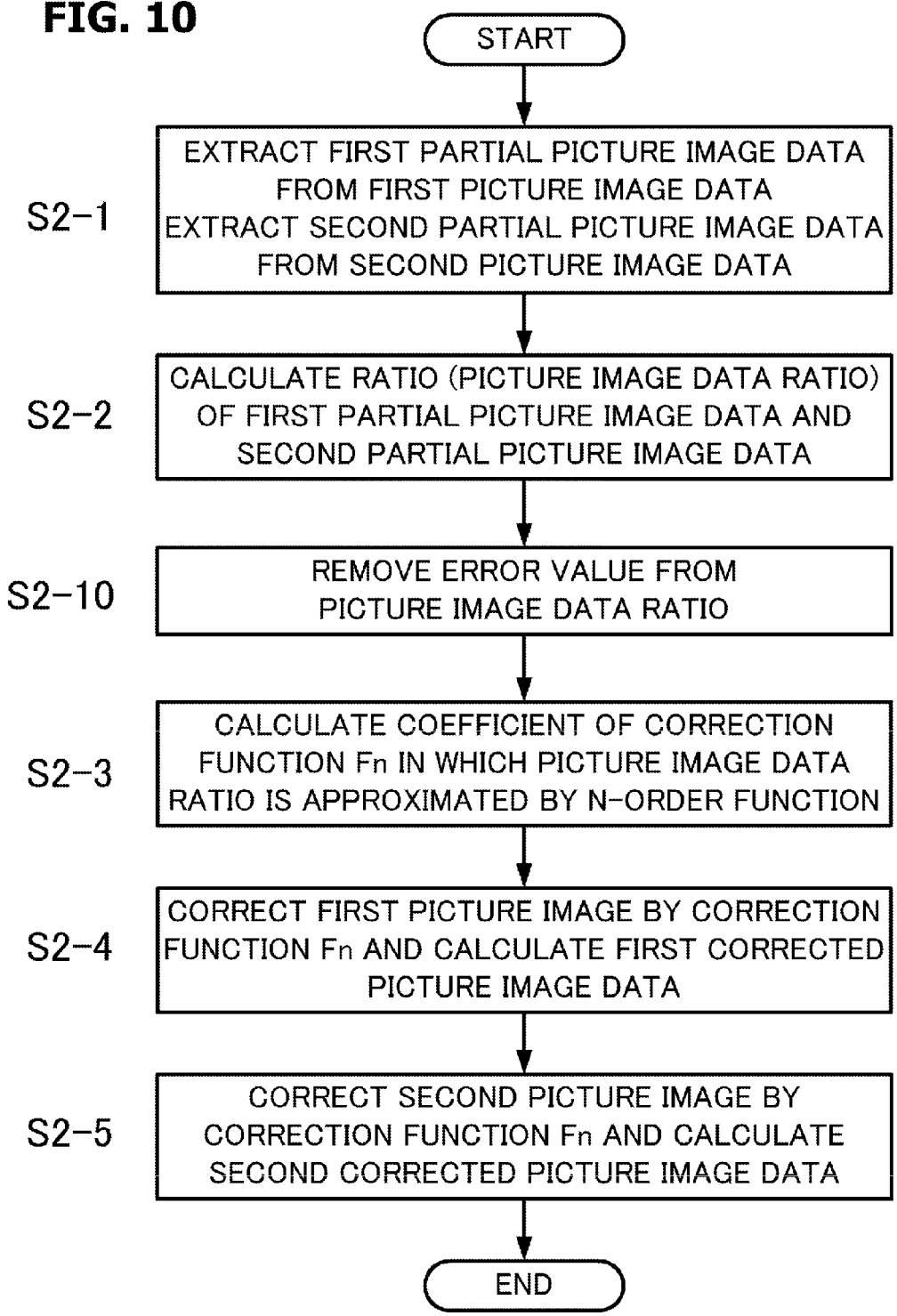
FIG. 10 is a flowchart of light quantity balance correction processing according to a variation example of the first embodiment.

Another form of the light quantity balance correction processing that is partially different from the light quantity balance correction processing explained with reference to FIG. 7 will be explained hereinbelow with reference to FIG. 10. Steps S2-1 to S2-5 in FIG. 10 are the same as explained using FIG. 7. Therefore, only step S2-10, which represents newly added processing, is explained below.

In step S2-10, the processing of removing an error value with a large effect of noise, such as light shot noise, or a large effect of image shift caused by the object distance from the output ratio data Rimg is performed in the following manner (data generation processing of approximation point calculation). First, differential output ratio data are calculated by subjecting the output ratio data Rimg to differential filtering. Then, only the data row in the output ratio data that corresponds to a data position at which the absolute value of the differential output ratio data is equal to or lower than a predetermined approximation point determination threshold (equal to or less than a first threshold) is extracted and the output ratio data are generated anew.

By additionally performing the processing of step S2-10, it is possible to reduce the approximation error of the correction function and correct the light quantity balance of the first picture image data and second picture image data with better accuracy. As a result, the object distance calculation error in the object distance calculation procedure of the present embodiment can be reduced. Further, in step S2-3 shown in FIG. 10, the correction function may be also calculated by a spline method (spline correction). Thus, the output ratio data after the removal of the error value may be divided into a plurality of regions in the x direction, and an N-order polynomial representing an N-order spline curve may be taken as the correction function Fn.

The processing of steps S2-7 to S2-9 illustrated by FIG. 9 and the processing of step S2-10 illustrated by FIG. 10 may be together included in the light quantity balance correction processing explained with reference to FIG. 7. In this case, the processing may be performed according to the flowchart shown in FIG. 11. Thus, step S2-9', in which the approximation point determination threshold is changed in addition to raising the order of the correction function Fn, may be performed instead of step S2-9. After step S2-9' has been performed, the processing returns to step S2-10 or step S2-3.

Figure 11:
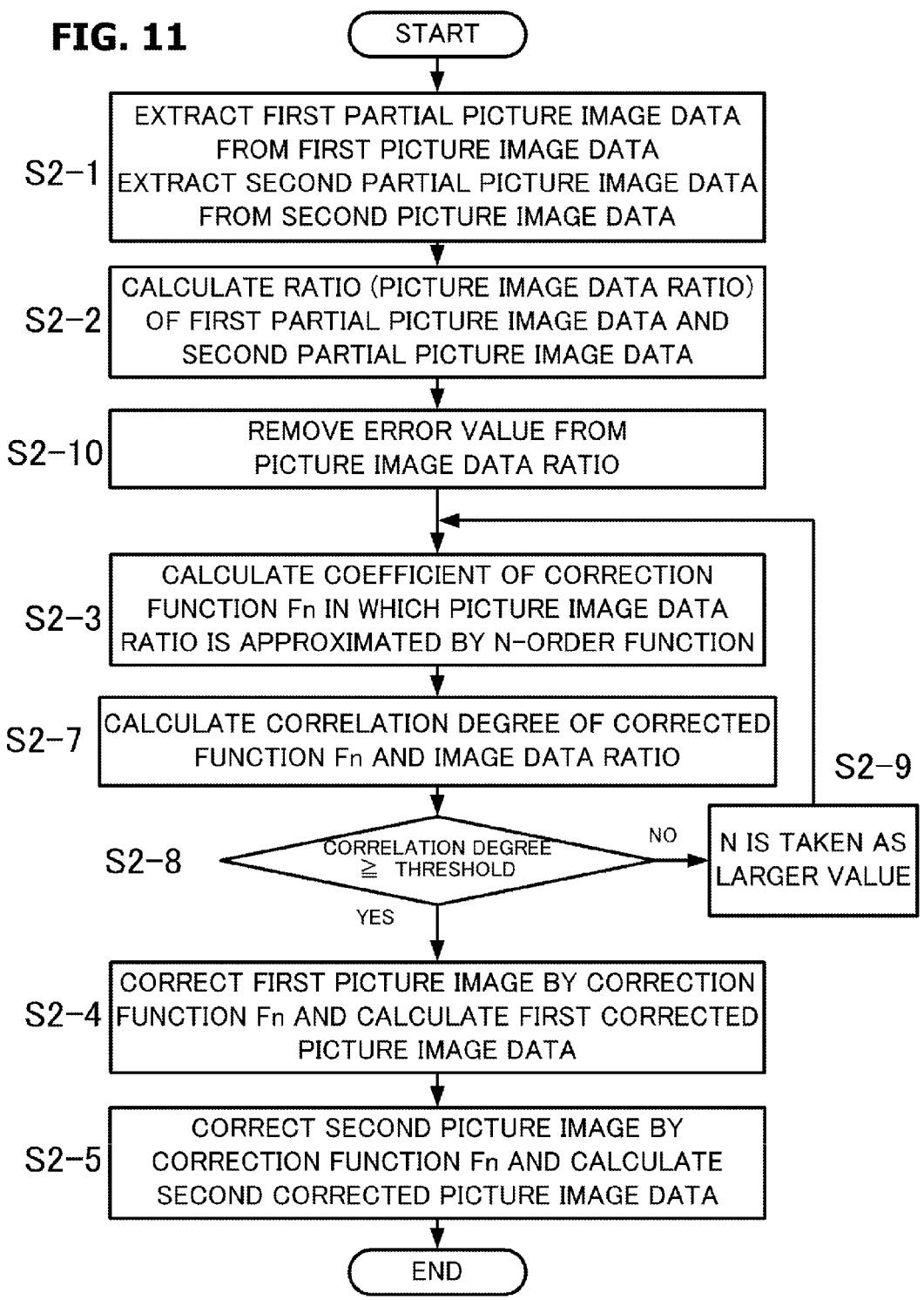
FIG. 11 is a flowchart of light quantity balance correction processing according to a variation example of the first embodiment.

In the light quantity balance correction processing explained using FIGS. 10 and 11, the error value is detected and removed by subjecting the output ratio data to differential filtering. Since the error value is caused by various types of noise (light shot noise and the like) or an image shift occurring when picture image data are acquired, a more accurate correction function can be generated by removing the error value. As a result, the light quantity balance of the first picture image data and second picture image data can be effectively corrected and the object distance can be calculated with good accuracy.

<Another Mode of Imaging Sensor 101>

Figure 12A:
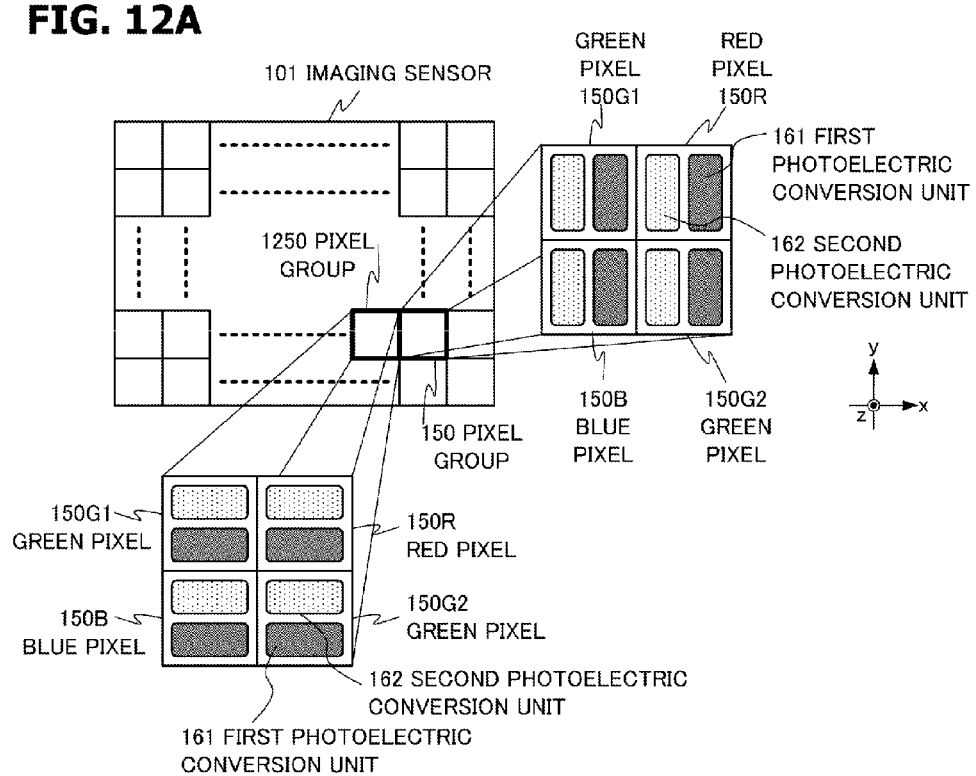
FIGS. 12A and 12B are configuration diagrams of an imaging sensor according to a variation example of the first embodiment.

In another mode, the imaging sensor 101 of the present embodiment may have a configuration in which two pixel groups 150 and 1250 are arranged in a checkerboard-like fashion, as shown in FIG. 12A. In the pixel group 150, the first photoelectric conversion unit 161 and the second photoelectric conversion unit 162 are arranged in the x direction. By applying the abovementioned ranging processing to the picture image data obtained from the pixel group 150, it is possible to calculate the distance to the object in which a brightness varies in the x direction. In the pixel group 1250, the first photoelectric conversion unit 161 and the second photoelectric conversion unit 162 are arranged in the y direction. By applying the abovementioned ranging processing to the picture image data obtained from the pixel group 1250, it is possible to calculate the distance to the object in which the brightness varies in the y direction.

Figure 12B:
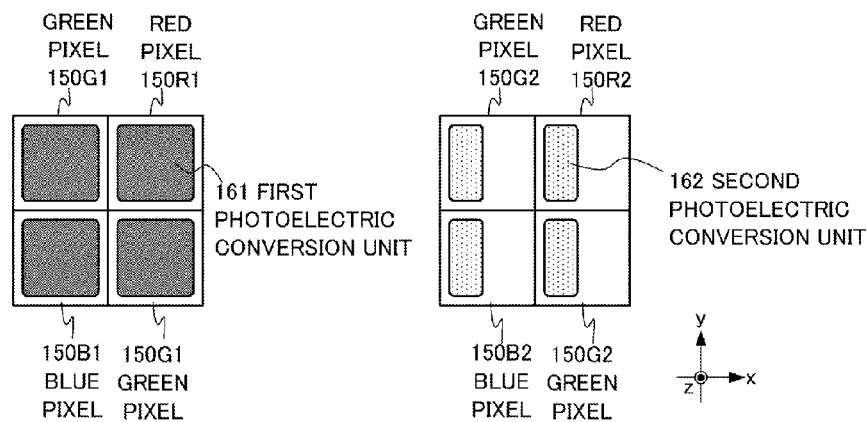

The imaging sensor 101 of another mode may use ranging pixel groups of two types such as shown in FIG. 12B. The first ranging pixel group is constituted by pixels (a green pixel 150G1, a red pixel 150R1, and a blue pixel 150B1) having only the first photoelectric conversion unit 161. The second ranging pixel group is constituted by pixels (a green pixel 150G2, a red pixel 150R2, and a blue pixel 150B2) having only the second photoelectric conversion unit 162. As shown in FIG. 12B, the area of the first photoelectric conversion unit 161 is larger than that of the second photoelectric conversion unit 162. The distance to the object can be calculated by taking the difference data between the picture image data generated in the plurality of first photoelectric conversion units 161 in each pixel and the picture image data generated in the plurality of second photoelectric conversion units 162 in each pixel as the aforementioned first picture image data.

A relative position shift corresponding to the distance to the object may occur between the picture image data generated in the first photoelectric conversion units 161 and the picture image data generated in the second photoelectric conversion units 162, and the distance to the object can be calculated in any mode.

The imaging sensor 101 of yet another mode may be configured such that the first photoelectric conversion unit 161 of the first ranging pixel group shown in FIG. 12B receives only the first light flux passing through the first pupil region of the imaging optical system. In this case, the picture image data generated in the first photoelectric conversion unit 161 become the first picture image data.

The ranging pixels are not required to be disposed over the entire surface of the imaging sensor 101, and a configuration may be used in which the ranging pixels are disposed only in a partial region of the imaging sensor 101 and the usual imaging pixels are disposed in other regions. The imaging pixel is provided with a photoelectric conversion unit (third photoelectric conversion unit) that receives and photoelectrically converts the light flux (first and second light flux) passing through the entire exit pupil of the imaging optical system 120 and generates imaging picture image data. In this case, the ornamental picture image may be generated only from the picture image data (imaging picture image data) obtained from the imaging pixels, or may be generated from the picture image data obtained from the imaging pixels and ranging pixels. Since the volume of the photoelectric conversion unit in the imaging pixel is larger than that in the ranging pixel, an image signal with a high SN ratio can be acquired. By setting, as necessary, the area ratio of the region occupied by the ranging pixels and the region occupied by the imaging pixels, it is possible to ensure both the calculation accuracy of the object distance and the quality of the ornamental picture image.

Second Embodiment

The second embodiment of the present invention will be described in greater detail with reference to the appended drawings.

In the explanation below, a digital camera is used as an example of the imaging apparatus provided with the ranging apparatus in accordance with the present invention, but the application of the present invention is not limited thereto. For example, the ranging apparatus in accordance with the present invention can be also used in a digital distance measuring apparatus.

In the explanation below that refers to the appended drawings, the same segments are assigned with the same reference numerals in different drawings in principle, and the redundant explanation thereof is herein avoided.

Figure 13:
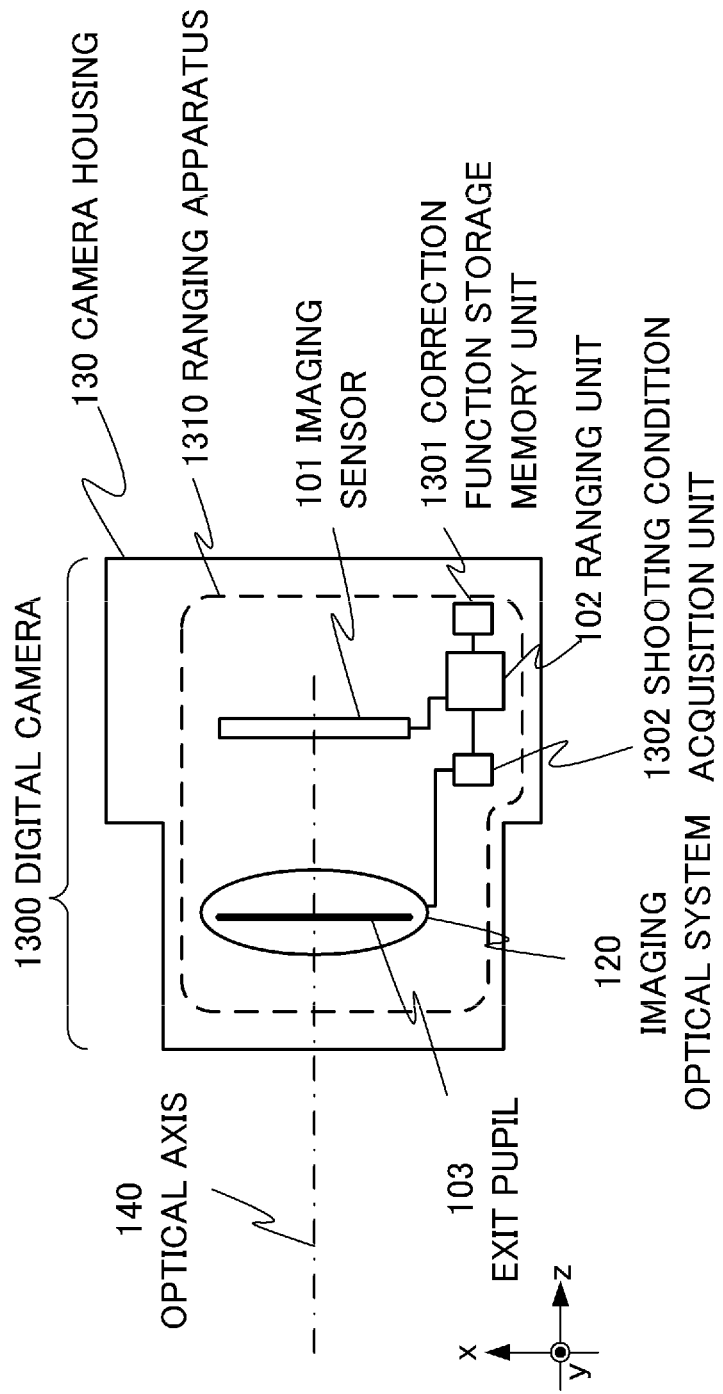
FIG. 13 is a configuration diagram of a digital camera according to a second embodiment.

In FIG. 13, the reference numeral 1300 stands for a digital camera equipped with a ranging apparatus 1310 of the present embodiment. The digital camera 1300 is constituted by disposing the imaging optical system 120, the imaging sensor 101, the ranging unit 102, a picture image generating unit (not shown in the figure), a lens drive control unit (not shown in the figure), a correction function storage memory unit 1301, and a shooting condition acquisition unit 1302 inside the camera housing 130. The ranging apparatus 1310 is configured of the imaging optical system 120, the imaging sensor 101, the ranging unit 102, the correction function storage memory unit 1301, and the shooting condition acquisition unit 1302.

In the correction function storage memory unit 1301, the correction function calculated in the past shooting is stored in association with the shooting conditions during the shooting.

The imaging optical system 120 is a lens of the digital camera 1300 and has a function of forming an image of an object on the imaging sensor 101, which is an imaging surface. The imaging optical system 120 is constituted by a plurality of lens groups (not shown in the figure), a diaphragm (not shown in the figure), and a mechanism for optical image stabilizer (not shown in the figure) and has the exit pupil 103 at a position at a predetermined distance from the imaging sensor 101. The mechanism for optical correction of shaking is constituted by a correction lens equipped with a gyro mechanism and corrects the shaking of an optical axis by moving the correction lens in the direction of canceling the shaking. The shooting condition acquisition unit 1302 acquires shooting image information on the imaging optical system 120, such as focal distance information, aperture value information, and correction amount of optical axis shaking (shift amount of the optical axis from the set value).

<Detailed Explanation of Light Quantity Balance Correction Processing>

The light quantity balance correction processing of the present embodiment will be explained hereinbelow in greater detail with reference to FIG. 14. Since steps S2-1 to S2-5 in FIG. 14 are the same as those explained with reference to FIG. 7, only steps S2-11 to S2-14 will be explained hereinbelow.

Step S2-11 is the processing of acquiring shooting condition information from the shooting condition acquisition unit 1302.

Step S2-12 is the processing of determining, on the basis of the shooting condition information, whether the correction function Fn that has already been stored in the correction function storage memory unit 1301 can be used. Where the shooting conditions at the time the first picture image data and the second picture image are acquired are different from the shooting conditions at the time the Fn stored in the correction function storage memory unit 1301 is generated, it is assumed that the correction function Fn should be generated anew and the processing advances to step S2-1. Meanwhile, where the shooting conditions at the time the first picture image data and the second picture image are acquired are substantially the same as the shooting conditions at the time the Fn stored in the correction function storage memory unit 1301 is generated, the processing advances to step S2-13. For example, the focal distance, aperture value, and shift amount of the optical axis can be used as the shooting condition information.

Step S2-13 is the processing of reading the correction function Fn from the correction function storage memory unit 1301.

Step S2-14 is the processing of storing the correction function Fn, which has been calculated through step S2-3, together with the shooting conditions in the correction function storage memory unit 1301.

In the ranging apparatus 1310 of the present embodiment, the light quantity balance correction processing explained using FIG. 14 is performed in the ranging unit 102. As a result, where the shooting conditions are the same as have been in the past, the correction function that has been generated at that time is read and reused, thereby making it possible to reduce the amount of processing required for calculating the correction function and calculate the object distance within a shorter period of time.

Further, in the present embodiment, the light quantity balance correction processing shown in FIG. 14 is explained, but the processing of the aforementioned steps S2-11 to S2-14 may be also added to the light quantity balance correction processing shown in FIGS. 9 and 10. In either case, the object distance calculation can be performed within a shorter period of time by reusing the correction function.

Specific implementations of the ranging apparatus in the above-described first and second embodiments include implementation with software (program) and implementation with hardware. For example, a computer program may be stored in the memory of a computer (microcomputer, CPU, MPU, FPGA or the like) incorporated in the imaging apparatus or picture image processing apparatus, and the processing operations may be realized by executing the computer program on a computer. Further, it is preferred that a dedicated processor such as an ASIC be provided for realizing the entire processing of the present invention or part thereof with a logical circuit. The present invention can be also applied to a server in a cloud environment.

Further, the present invention can be also implemented, for example, by using a method constituted by steps executed with a computer of a system or a device realizing the functions of the aforementioned embodiments by reading and executing a program recorded on a storage device. For this purpose, the program is provided to the computer via a network or from recording media of various types that can serve as the storage device (in other words, a computer-readable recording media that stores data non-transitorily). Therefore, the computer (including devices such as a CPU and a MPU), the method, the program (including a program code and a program product), and the computer readable recording medium that stores the program non-transitorily are also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-210114, filed on Oct. 7, 2013, which is hereby incorporated by reference herein in its entirety.

What is claimed is:

1. An image data processing apparatus comprising:
an acquisition unit configured to acquire first image data and second image data, the first image data being a group of pixel values based on a first light flux passing through a first pupil region of an imaging optical system, and the second image data being a group of pixel values based on a second light flux passing through a second pupil region of the imaging optical system, the second pupil region being different from the first pupil region and shifted along a first direction with respect to the first pupil region;
a ratio data calculation unit configured to calculate (i) a value of a ratio of at least some part of the first image data and the second image data and (ii) ratio data, wherein the ratio data includes values of the ratio of the pixel values along the first direction; and
a correction unit configured to correct at least one of the first image data and the second image data on the basis of the ratio data.

2. The image data processing apparatus according to claim 1, wherein the ratio data calculation unit is further configured to calculate the ratio data using a value of a ratio of first partial image data included in the first image data and second partial image data included in the second image data.

3. The image data processing apparatus according to claim 1, further comprising a correction function calculation unit configured to calculate a correction function approximating the ratio data having a position along the first direction as a variable.

4. The image data processing apparatus according to claim 3, wherein the correction function calculation unit is further configured to calculate the correction function by using only data included in the ratio data at a position at which an absolute value of differential ratio data produced by applying a differential filter on the ratio data is equal to or less than a first threshold.

5. The image data processing apparatus according to claim 3, wherein the correction function is an N-order function, N being a natural number.

6. The image data processing apparatus according to claim 5, wherein
a correlation degree representing a correlation of the correction function and the ratio data is calculated,
whether or not the correlation degree is equal to or greater than a second threshold is determined, and
the value of order N is increased and the correction function calculation unit calculates the correction function again when the correlation degree of the correction function and the ratio data is determined to be less than the second threshold.

7. The image data processing apparatus according to claim 6, wherein when the correlation degree of the correction function and the ratio data is determined to be less than the second threshold, the value of the order N at the time of repeated execution of the calculation of the correction function is set according to a value of the correlation degree.

8. The image data processing apparatus according to claim 3, further comprising:
a correction function storage unit configured to store a default correction function in association with a shooting condition; and
a shooting condition acquisition unit configured to acquire the shooting condition at a time when the first image data and the second image data are acquired, wherein
when the stored default correction function corresponds to the acquired shooting condition, the correction unit performs correction by using the stored default correction function, and when the stored default correction function does not correspond to the acquired shooting condition, the correction unit performs correction by using a correction function calculated by the correction function calculation unit.

9. The image data processing apparatus according to claim 1, wherein the area of the first pupil region is greater that the area of the second pupil region, and the first pupil region encompasses the second pupil region.

10. A distance calculation apparatus comprising:
the image data processing apparatus according to claim 9; and
a distance calculation unit configured to calculate an image shift amount using the image data corrected by the correction unit, the image shift amount being an amount of relative positional shift between the second image data and third image data, the third image data being difference data between the first and second image data.

11. The distance calculation apparatus according to claim 10, wherein the distance calculation unit is configured to calculate a defocus amount or a distance to an object on the basis of the image shift amount.

12. A distance calculation apparatus comprising:
the image data processing apparatus according to claim 1; and
a distance calculation unit configured to calculate an image shift amount using the image data corrected by the correction unit, the image shift amount being an amount of relative positional shift between the first image data and the second image data.

13. An imaging apparatus comprising:
an imaging optical system;
an imaging sensor configured to acquire first image data based on a first light flux passing through a first pupil region of the imaging optical system, and second picture image data based on a second light flux passing through a second pupil region of the imaging optical system; and
the image data processing apparatus according to claim 1.

14. The imaging apparatus according to claim 13, wherein the imaging sensor comprises:
a ranging pixel provided with a first photoelectric conversion unit and a second photoelectric conversion unit, the first photoelectric conversion unit configured to generate the first image data by photoelectrically converting the first light flux, and the second photoelectric conversion unit configured to generate the second image data by photoelectrically converting the second light flux; and
an imaging pixel provided with a third photoelectric conversion unit configured to generate third image data by photoelectrically converting the first light flux and the second light flux.

15. The imaging apparatus according to claim 13, wherein the imaging sensor comprises:
a first pixel provided with a first photoelectric conversion unit configured to generate the first image data by photoelectrically converting the first light flux;
a second pixel provided with a second photoelectric conversion unit configured to generate the second image data by photoelectrically converting the second light flux; and
an imaging pixel provided with a third photoelectric conversion unit configured to generate third image data by photoelectrically converting the first light flux and the second light flux.

16. An image data processing method comprising:
an acquisition step of acquiring first image data and second image data, the first image data being a group of pixel values based on a first light flux passing through a first pupil region of an imaging optical system, and the second image data being a group of pixel values based on a second light flux passing through a second pupil region of the imaging optical system, the second pupil region being different from the first pupil region and shifted along a first direction with respect to the first pupil region;

a ratio data calculation step of calculating a value of a ratio of at least some part of the first image data and the second image data, and of calculating ratio data, wherein the ratio data includes values of the ratio of pixel values along the first direction; and a correction step of correcting at least one of the first image data and the second image data on the basis of the ratio data.

17. A non-transitory computer-readable recording medium configured to store a computer program for causing a computer to execute the steps of the image data processing method of claim 16.

* * * * *